(12) United States Patent
Koyama

(10) Patent No.: US 12,528,313 B2
(45) Date of Patent: Jan. 20, 2026

(54) PNEUMATIC TIRE AND METHOD OF MANUFACTURING PNEUMATIC TIRE

(71) Applicant: The Yokohama Rubber Co., LTD., Tokyo (JP)

(72) Inventor: Noriyoshi Koyama, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 504 days.

(21) Appl. No.: 17/757,264

(22) PCT Filed: Oct. 15, 2020

(86) PCT No.: PCT/JP2020/038884
§ 371 (c)(1),
(2) Date: Jun. 13, 2022

(87) PCT Pub. No.: WO2021/124662
PCT Pub. Date: Jun. 24, 2021

(65) Prior Publication Data
US 2023/0001742 A1    Jan. 5, 2023

(30) Foreign Application Priority Data
Dec. 18, 2019   (JP) .................. 2019-228603

(51) Int. Cl.
*B60C 9/20* (2006.01)
*B29D 30/30* (2006.01)
*B29D 30/70* (2006.01)

(52) U.S. Cl.
CPC .......... *B60C 9/20* (2013.01); *B29D 30/3028* (2013.01); *B29D 30/70* (2013.01); *B60C 2009/2035* (2013.01); *B60C 2009/2045* (2013.01)

(58) Field of Classification Search
CPC ........... B60C 9/18; B60C 9/20; B60C 9/2204; B60C 2009/2035; B60C 2009/2045;
(Continued)

(56) References Cited

U.S. PATENT DOCUMENTS 5,178,703 A * 1/1993 Onoda ................. B60C 9/2204
152/533
5,213,642 A * 5/1993 Sponagel ................. B60C 9/20
152/533
(Continued)

FOREIGN PATENT DOCUMENTS

JP    5-162509 A    6/1993
JP    6-344720 A    12/1994
(Continued)

OTHER PUBLICATIONS

Matsui, JP2012116246A, machine translation. (Year: 2012).*
Takase, JP H05162509, updated machine translation. (Year: 1993).*
Suda Y, JP-2002046421-A, machine translation. (Year: 2002).*

*Primary Examiner* — Sedef E Paquette
(74) *Attorney, Agent, or Firm* — Thorpe North & Western

(57) ABSTRACT

A belt cover layer is disposed in a tire, spanning between shoulder regions, and is formed by winding one belt cover material in a helical shape around a rotation axis on an outer side of the belt layer in a radial direction, the belt cover layer includes a lap winding portion between the shoulder regions, in which parts of circumferential portions, adjacent in a width direction, of the belt cover material wound in a helical shape are lap-wound in the radial direction, a width of the lap winding portion in the width direction is 3-30% of a width of the belt cover layer in the width direction, and in portions of the belt cover layer in the shoulder regions, the circumferential portions, adjacent in the width direction, of the belt cover material are wound with out being lapped in the radial direction.

14 Claims, 13 Drawing Sheets

(58) Field of Classification Search
CPC .... B60C 2011/0341; B60C 2011/0388; B29D 30/16; B29D 30/1621; B29D 30/1628; B29D 30/30; B29D 30/3021; B29D 30/3028; B29D 30/70
USPC ................................. 152/533; 156/117, 130
See application file for complete search history.

(56) References Cited

U.S. PATENT DOCUMENTS

| | | | | |
|---|---|---|---|---|
| 5,332,018 A | * | 7/1994 | Roesgen | B60C 9/2204 |
| | | | | 152/533 |
| 5,922,154 A | * | 7/1999 | Lowenhaupt | B60C 9/2009 |
| | | | | 152/533 |
| 2020/0148013 A1 | | 5/2020 | Zelma et al. | |

FOREIGN PATENT DOCUMENTS

| | | | |
|---|---|---|---|
| JP | 2001-253208 A | | 9/2001 |
| JP | 2002046421 A | * | 2/2002 |
| JP | 2008-6963 A | | 1/2008 |
| JP | 2009-255753 A | | 11/2009 |
| JP | 2010-64644 A | | 3/2010 |
| JP | 2010-247706 A | | 11/2010 |
| JP | 4635366 B2 | | 2/2011 |
| JP | 2011-68324 A | | 4/2011 |
| JP | 4687201 B2 | | 5/2011 |
| JP | 4865259 B2 | | 2/2012 |
| JP | 2012-116246 A | | 6/2012 |
| JP | 2017-137032 A | | 8/2017 |
| JP | 2019-182195 A | | 10/2019 |
| WO | WO 2019/018178 A1 | | 1/2019 |

* cited by examiner

| | Conventional Example | Comparative Example 1 | Comparative Example 2 | Comparative Example 3 | Comparative Example 4 |
|---|---|---|---|---|---|
| Presence of lap winding portion (two-layer portion) | NO | YES | YES | YES | YES |
| Number of belt cover materials | One | Two | One | One | One |
| Width of lap winding portion (two-layer portion) with respect to width of belt cover layer | - | 12% | 2% | 35% | 12% |
| Presence of lap winding in shoulder region | NO | NO | NO | NO | YES |
| Width of lap winding portion (two-layer portion) | - | 20 mm | 3 mm | 58 mm | 20 mm |
| Width of lap portion with respect to width of belt cover material | - | - | 50% | 50% | 50% |
| Presence of second full cover layer | NO | NO | NO | NO | NO |
| Shock burst resistance performance | 100 | 120 | 118 | 126 | 119 |
| Productivity | 100 | 78 | 98 | 91 | 93 |
| Overall Performance (total index value) | 200 | 198 | 216 | 217 | 212 |

FIG. 12A

| | Example 1 | Example 2 | Example 3 | Example 4 | Example 5 | Example 6 | Example 7 | Example 8 | Example 9 |
|---|---|---|---|---|---|---|---|---|---|
| Presence of lap winding portion (two-layer portion) | YES | YES | YES | YES | YES | YES | YES | YES | YES |
| Number of belt cover materials | One | One | One | One | One | One | One | One | One |
| Width of lap winding portion (two-layer portion) with respect to width of belt cover layer | 3% | 14% | 24% | 30% | 14% | 14% | 14% | 14% | 14% |
| Presence of lap winding in shoulder region | NO | NO | NO | NO | NO | NO | NO | NO | NO |
| Width of lap winding portion (two-layer portion) | 5 mm | 24 mm | 40 mm | 50 mm | 24 mm | 24 mm | 24 mm | 24 mm | 24 mm |
| Width of lap portion with respect to width of belt cover material | 50% | 50% | 50% | 50% | 15% | 20% | 70% | 75% | 50% |
| Presence of second full cover layer | NO | NO | NO | NO | NO | NO | NO | NO | YES |
| Shock burst resistance performance | 122 | 124 | 125 | 126 | 122 | 123 | 124 | 125 | 141 |
| Productivity | 97 | 95 | 94 | 93 | 97 | 96 | 95 | 94 | 90 |

FIG. 12B

PNEUMATIC TIRE AND METHOD OF MANUFACTURING PNEUMATIC TIRE

TECHNICAL FIELD

The present technology relates to a pneumatic tire, and a method for manufacturing a pneumatic tire.

BACKGROUND ART

Some pneumatic tires in the related art have achieved desired performance by devising a member disposed on an outer side in a tire radial direction of a belt layer. For example, a pneumatic tire described in Japan Patent No. 4865259 improves projection resistance in such a way that two belt protecting layers are disposed on an outer side in a tire radial direction of a belt layer, and the belt protecting layer on the outer side in the tire radial direction has a narrower width than a width of the belt protecting layer on an inner side in the tire radial direction. In a pneumatic tire described in Japan Unexamined Patent Publication No. 2010-64644, a belt reinforcing layer is disposed between a tread portion and a belt layer, and the belt reinforcing layer is configured to be three layers on a tire equatorial portion to ensure breaking energy while suppressing an increase in weight.

A pneumatic tire described in Japan Unexamined Patent Publication No. 2017-137032 includes a band-like sound absorbing member adhered to a tire inner surface in a tread portion, a full cover layer disposed on an outer circumferential side of a belt layer, and a center cover layer disposed on an outer circumferential side of the full cover layer and locally covering a tire width central region. By defining respective widths of the band-like sound absorbing member and the belt layer and widths of the center cover layer and the band-like sound absorbing member, a decrease in high-speed durability caused by accumulation of heat in the band-like sound absorbing member is reduced while obtaining sufficient quietness by the band-like sound absorbing member.

In a pneumatic tire described in Japan Patent No. 4635366, a belt cover layer constituted by an end portion belt cover layer and a central portion belt cover layer is disposed outside a belt layer, and a tensile strength of organic fiber cords forming the end portion belt cover layer and the central portion belt cover layer and a sum of the end portion belt cover layer and the central portion belt cover layer are defined to ensure reduction in road noise in a high frequency band and weight reduction. Additionally, a pneumatic tire described in Japan Patent No. 4687201 includes a belt cover formed by helically winding a strip material on an outer circumferential side of a belt layer. In the belt cover, lap winding of the strip material at a position covering an end portion in a tire width direction in the belt layer and a position covering a central portion in the tire width direction in the belt layer improves steering stability and durability.

Here, among pneumatic tires, for example, there are pneumatic tires that can accommodate a high load, such as a pneumatic tire with EXTRA LOAD standard. Such pneumatic tires can be used at relatively high air pressures for accommodating high loads. Meanwhile, when the air pressure of the pneumatic tire is increased, rigidity of a tread portion increases. As a result, the tread portion is less likely to deform when a foreign material is trodden, and a shock burst, which is caused by the foreign material being trodden, is likely to occur. That is, the use of the pneumatic tire at high air pressure is likely to reduce shock burst resistance performance, which is a resistance against a shock burst.

A shock burst is likely to occur by treading on a foreign material on a road surface with a region at or near a tire equatorial plane on a ground contact surface of the tread portion. Accordingly, to improve shock burst resistance performance, reinforcement at or near the tire equatorial plane in the tread portion is effective. However, new addition of a member for reinforcement increases a manufacturing process by that much, thereby reducing productivity. For this reason, achieving both shock burst resistance performance and productivity in a compatible manner has been extremely difficult.

SUMMARY

The present technology provides a pneumatic tire that is capable of achieving both shock burst resistance performance and productivity in a compatible manner, and a method for manufacturing the pneumatic tire.

An embodiment of the present technology provides a pneumatic tire including a tread portion, a belt layer disposed in the tread portion, and a belt cover layer disposed on an outer side of the belt layer in a tire radial direction, the belt cover layer being disposed spanning between shoulder regions on both sides in a tire width direction, the belt cover layer being formed by winding one belt cover material having a band-like shape, in a helical shape around a tire rotation axis on the outer side of the belt layer in the tire radial direction, the belt cover layer including a lap winding portion formed between the shoulder regions on both sides in the tire width direction, the lap winding portion including a lap portion in which parts of circumferential portions, adjacent in the tire width direction, of the belt cover material wound in a helical shape are lap-wound in the tire radial direction, a width of the lap winding portion in the tire width direction being within a range of 3% or more and 30% or less of a width of the belt cover layer in the tire width direction, and in portions of the belt cover layer located in the shoulder regions, the circumferential portions, adjacent in the tire width direction, of the belt cover material wound in a helical shape being wound without being lapped in the tire radial direction.

Additionally, in the pneumatic tire, preferably, the width of the lap winding portion in the tire width direction is within a range of 5 mm or more and 40 mm or less.

In addition, in the pneumatic tire, preferably, the lap winding portion is formed across a tire equatorial plane in the tire width direction.

Additionally, in the pneumatic tire, preferably, a width of the lap portion of the lap winding portion is within a range of 20% or more and 70% or less of a width of the belt cover material.

Additionally, in the pneumatic tire described above, preferably, the belt cover layer includes a first full cover layer including the lap winding portion and formed spanning between the shoulder regions on both sides in the tire width direction, and a second full cover layer stacked on the first full cover layer in the tire radial direction and formed spanning between the shoulder regions on both sides in the tire width direction, and in a portion of the belt cover layer in which the lap portion is located in the tire width direction, the belt cover material includes three or more layers lapped in the tire radial direction.

In addition, in the pneumatic tire described above, preferably, in the lap winding portion, a width of the lap portion varies depending on a position in the tire width direction.

Additionally, an embodiment of the present technology provides a method of manufacturing a pneumatic tire, in which a belt cover layer is disposed by winding a belt cover material having a band-like shape, in a helical shape around a tire rotation axis on an outer side of a belt layer in a tire radial direction, the method including the steps of: forming the belt cover layer between shoulder regions by winding one belt cover material in a helical shape spanning between the shoulder regions on both sides in a tire width direction; and forming, between the shoulder regions on both sides in the tire width direction, a lap winding portion in which parts of circumferential portions, adjacent in the tire width direction, of the belt cover material wound in a helical shape are lap-wound in the tire radial direction, the step of forming the lap winding portion being included in the step of forming the belt cover layer, in the step of forming the belt cover layer between the shoulder regions, in portions of the belt cover layer located in the shoulder regions, the circumferential portions, adjacent in the tire width direction, of the belt cover material wound in a helical shape being wound without being lapped in the tire radial direction, and in the step of forming the lap winding portion, the lap winding portion being formed such that a width of the lap winding portion in the tire width direction is within a range of 3% or more and 30% or less of a width of the belt cover layer in the tire width direction.

The pneumatic tire and the method of manufacturing a pneumatic tire according to an embodiment of the present technology can achieve the effect of achieving both shock burst resistance performance and productivity in a compatible manner.

BRIEF DESCRIPTION OF DRAWINGS

FIGS. 12A-12B include a table showing results of performance evaluation tests of pneumatic tires.

DETAILED DESCRIPTION

Embodiments of a pneumatic tire and a method for manufacturing a pneumatic tire according to embodiments of the present technology will be described in detail below with reference to the drawings. However, the present technology is not limited by the embodiment. Constituents of the following embodiments include elements that are essentially identical or that can be substituted or easily conceived of by a person skilled in the art.

Embodiments

Pneumatic Tire

In the following description, the term "tire radial direction" refers to a direction orthogonal to the tire rotation axis (not illustrated) which is a rotation axis of a pneumatic tire 1, the term "inner side in the tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equatorial line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line in the tire circumferential direction of the pneumatic tire 1 that lies on the tire equatorial plane CL.

Figure 1:
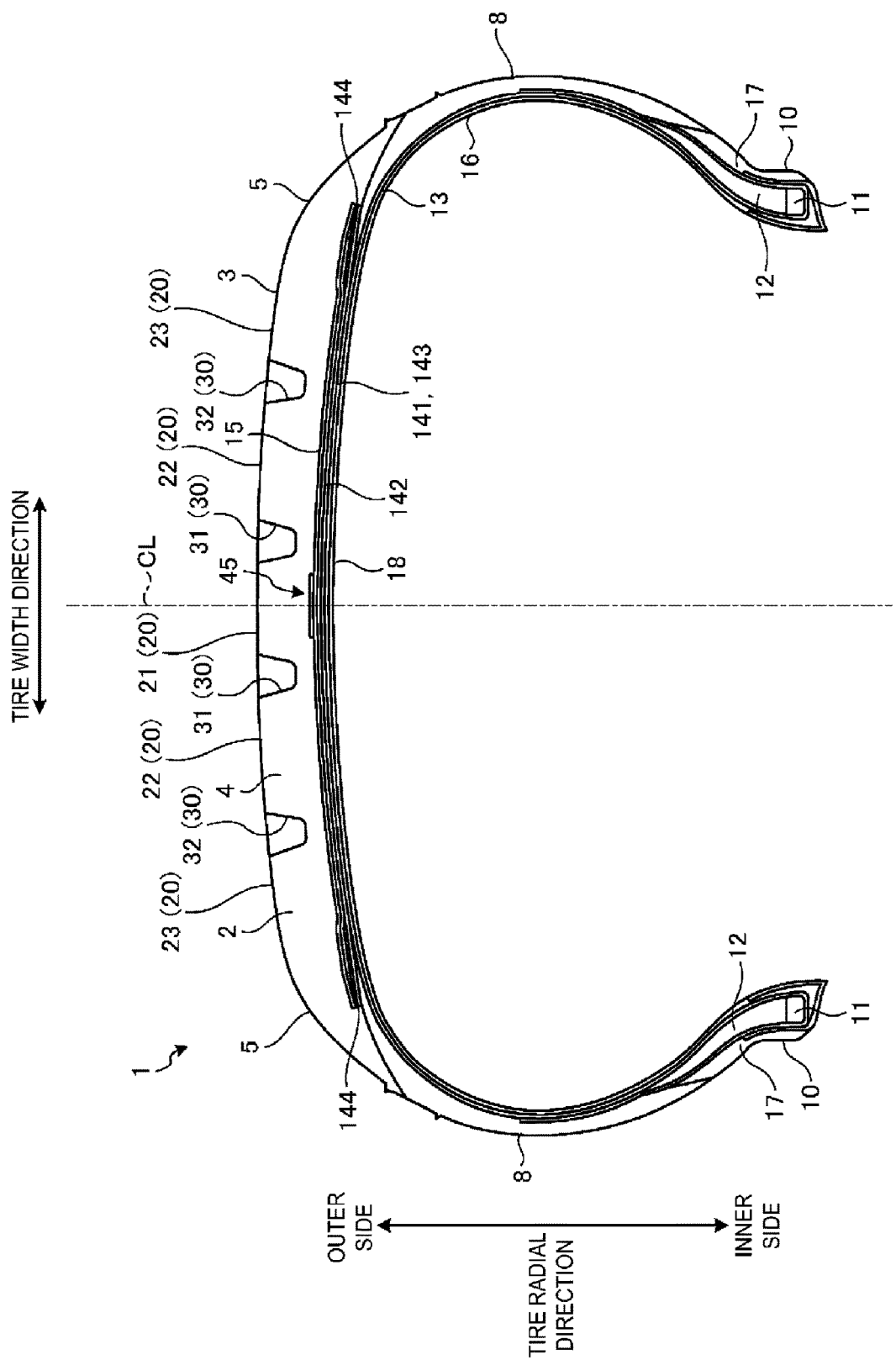
FIG. 1 is a meridian cross-sectional diagram illustrating a main portion of a pneumatic tire according to an embodiment.

FIG. 1 is a meridian cross-sectional view illustrating a main portion of the pneumatic tire 1 according to the embodiment. The pneumatic tire 1 according to the present embodiment is the pneumatic tire 1 that can accommodate use at high loads, such as the pneumatic tire 1 with EXTRA LOAD standard. In the pneumatic tire 1 according to the present embodiment, a tread portion 2 is disposed on a portion on the outermost side in the tire radial direction when viewed in a meridian cross-section, and the tread portion 2 includes a tread rubber layer 4 made of a rubber composition. A surface of the tread portion 2, that is, a portion in contact with a road surface during traveling of a vehicle (not illustrated) having the pneumatic tires 1 mounted thereon is formed as a ground contact surface 3, and the ground contact surface 3 forms a part of a contour of the pneumatic tire 1. A plurality of main grooves 30 extending in the tire circumferential direction are formed in the ground contact surface 3 in the tread portion 2, and a plurality of land portions 20 are defined by the plurality of main grooves 30 on the surface of the tread portion 2. In the present embodiment, four main grooves 30 are formed side by side in the tire width direction, and each two of the four main grooves 30 are disposed on both sides in the tire width direction of the tire equatorial plane CL. In other words, the four main grooves 30 in total are formed in the tread portion 2, including: two center main grooves 31 disposed on both sides of the tire equatorial plane CL; and two shoulder main grooves 32 disposed on an outer side in the tire width direction of each of the two center main grooves 31.

Note that "main groove 30" refers to a vertical groove in which at least a part is extending in the tire circumferential direction. In general, the main groove 30 has a groove width 3 mm or more and a groove depth of 6 mm or more and has a tread wear indicator (slip sign) therein, indicating terminal stages of wear. In the present embodiment, the main groove 30 has a groove width within a range of 6 mm or more and 25 mm or less and a groove depth within a range of 6 mm or more and 9 mm or less and is substantially parallel to a tire equator line (centerline) where the tire equatorial plane CL and the ground contact surface 3 intersect. The main grooves 30 may extend linearly in the tire circumferential direction or may be provided in a wave shape or a zigzag shape.

Of the land portions 20 defined by the main grooves 30, the land portion 20 positioned between the two center main grooves 31 and positioned on the tire equatorial plane CL is a center land portion 21. Moreover, the land portions 20 positioned between the adjacent center main grooves 31 and shoulder main grooves 32 and disposed on the outer side in the tire width direction of the center land portion 21 are second land portions 22. Moreover, the land portions 20 positioned on the outer side in the tire width direction of the second land portions 22 and adjacent to the second land portions 22 with the shoulder main grooves 32 disposed therebetween are shoulder land portions 23.

Note that the land portions 20 may be formed in a rib shape across one circumference in the tire circumferential direction, and a plurality of lug grooves (not illustrated) extending in the tire width direction may be formed in the tread portion 2. Thus, the land portions 20 may be defined by the main grooves 30 and the lug grooves, and each of the land portions 20 may be formed in a block shape. In the present embodiment, the land portion 20 is formed as the rib-shaped land portion 20 formed across one circumference in the tire circumferential direction.

Shoulder portions 5 are positioned at both ends on outer sides of the tread portion 2 in the tire width direction, and sidewall portions 8 are disposed on inner sides in the tire radial direction of the shoulder portions 5. In other words, the sidewall portions 8 are disposed on both sides in the tire width direction of the tread portion 2. In other words, the sidewall portions 8 are disposed at two sections on both sides in the tire width direction of the pneumatic tire 1 and form portions exposed to the outermost sides in the tire width direction of the pneumatic tire 1.

A bead portion 10 is located on an inner side in the tire radial direction of each of the sidewall portions 8 located on both sides in the tire width direction. Similarly to the sidewall portions 8, the bead portions 10 are disposed at two sections on both sides of the tire equatorial plane CL. That is, a pair of the bead portions 10 is disposed on both sides in the tire width direction of the tire equatorial plane CL. Each bead portion 10 is provided with a bead core 11, and a bead filler 12 is provided on an outer side in the tire radial direction of the bead core 11. The bead core 11 is an annular member formed in an annular shape by bundling bead wires, which are steel wires, and the bead filler 12 is a rubber member disposed on the outer side in the tire radial direction of the bead core 11.

A belt layer 14 is disposed in the tread portion 2. The belt layer 14 is formed by a multilayer structure in which a plurality of belts 141, 142 are layered, and the two layers of the belts 141, 142 are layered in the present embodiment. The belts 141, 142 constituting the belt layer 14 are formed by rolling and covering, with coating rubber, a plurality of belt cords made of steel or an organic fiber material, such as polyester, rayon, or nylon, and a belt angle defined as an inclination angle of the belt cords with respect to the tire circumferential direction is within a predetermined range (for example, of 20° or more and 55° or less). Furthermore, the belt angles of the two layers of the belts 141, 142 differ from each another. Accordingly, the belt layer 14 is configured as a so-called crossply structure in which the two layers of the belts 141, 142 are layered with the inclination directions of the belt cords intersecting with each another. In other words, the two layers of the belts 141, 142 are provided as so-called cross belts in which the belt cords provided with the respective belts 141, 142 are disposed in mutually intersecting orientations.

A belt cover layer 15 is disposed on the outer side in the tire radial direction of the belt layer 14. The belt cover layer 15 is disposed on the outer side in the tire radial direction of the belt layer 14, covers the belt layer 14 in the tire circumferential direction, and is provided as a reinforcing layer that reinforces the belt layer 14. The belt cover layer 15 is formed by covering, with coating rubber, a plurality of cords (not illustrated) disposed side by side in the tire width direction substantially parallel to the tire circumferential direction. The cords provided with the belt cover layer 15 are made of, for example, steel or an organic fiber, such as polyester, polyethylene terephthalate, rayon, nylon, and a hybrid of a polyamide composite+α, and a cord angle is within a range of ±5° with respect to the tire circumferential direction. Moreover, in the cords provided with the belt cover layer 15, a wire diameter, which is a diameter of the cord, is within a range of 0.5 mm or more and 1.8 mm or less, and a cord count per 50 mm in an arrangement direction of the cords is within a range of 30 or more and 80 or less.

In the present embodiment, the belt cover layer 15 is disposed across the entire region of the range in the tire width direction in which the belt layer 14 is disposed and covers end portions in the tire width direction of the belt layer 14. In other words, the belt cover layer 15 is formed as a full cover layer that completely covers the belt layer 14 in the tire width direction from the outer side in the tire radial direction. The tread rubber layer 4 provided with the tread portion 2 is disposed on the outer side in the tire radial direction of the belt cover layer 15 in the tread portion 2.

A carcass layer 13 containing the cords of radial plies is continuously provided on an inner side in the tire radial direction of the belt layer 14 and on a side of the sidewall portion 8 close to the tire equatorial plane CL. Accordingly, the pneumatic tire 1 according to the present embodiment is configured as a so-called radial tire. The carcass layer 13 has a single layer structure made of one carcass ply or a multilayer structure made of a plurality of carcass plies being layered, and spans between the pair of bead portions 10 disposed on both sides in the tire width direction in a toroidal shape to form the framework of the tire.

Specifically, the carcass layer 13 is disposed to span from one bead portion 10 to the other bead portion 10 among the pair of bead portions 10 located on both sides in the tire width direction and turns back toward the outer side in the tire width direction along the bead cores 11 at the bead portions 10 wrapping around the bead cores 11 and the bead fillers 12. The bead filler 12 is a rubber member disposed in a space formed on the outer side in the tire radial direction of the bead core 11 when the carcass layer 13 is folded back at the bead portion 10. Moreover, the belt layer 14 is disposed on the outer side in the tire radial direction of a portion, located in the tread portion 2, of the carcass layer 13 spanning between the pair of bead portions 10. Moreover, the carcass ply of the carcass layer 13 is made by rolling subsequent to covering, with coating rubber, a plurality of carcass cords made from steel or an organic fiber material such as aramid, nylon, polyester, or rayon. The plurality of carcass cords that form the carcass ply are disposed side by side with an angle in the tire circumferential direction, the angle with respect to the tire circumferential direction following a tire meridian direction.

At the bead portion 10, a rim cushion rubber 17 is disposed on an inner side in the tire radial direction and an outer side in the tire width direction of the bead core 11 and a turned back portion of the carcass layer 13, the rim cushion rubber 17 forming a contact surface of the bead portion 10 against the rim flange. Additionally, an innerliner 16 is formed along the carcass layer 13 on the inner side of the carcass layer 13 or on the inner portion side of the carcass layer 13 in the pneumatic tire 1. The innerliner 16 forms a tire inner surface 18 that is a surface on the inner side of the pneumatic tire 1.

Figure 2:
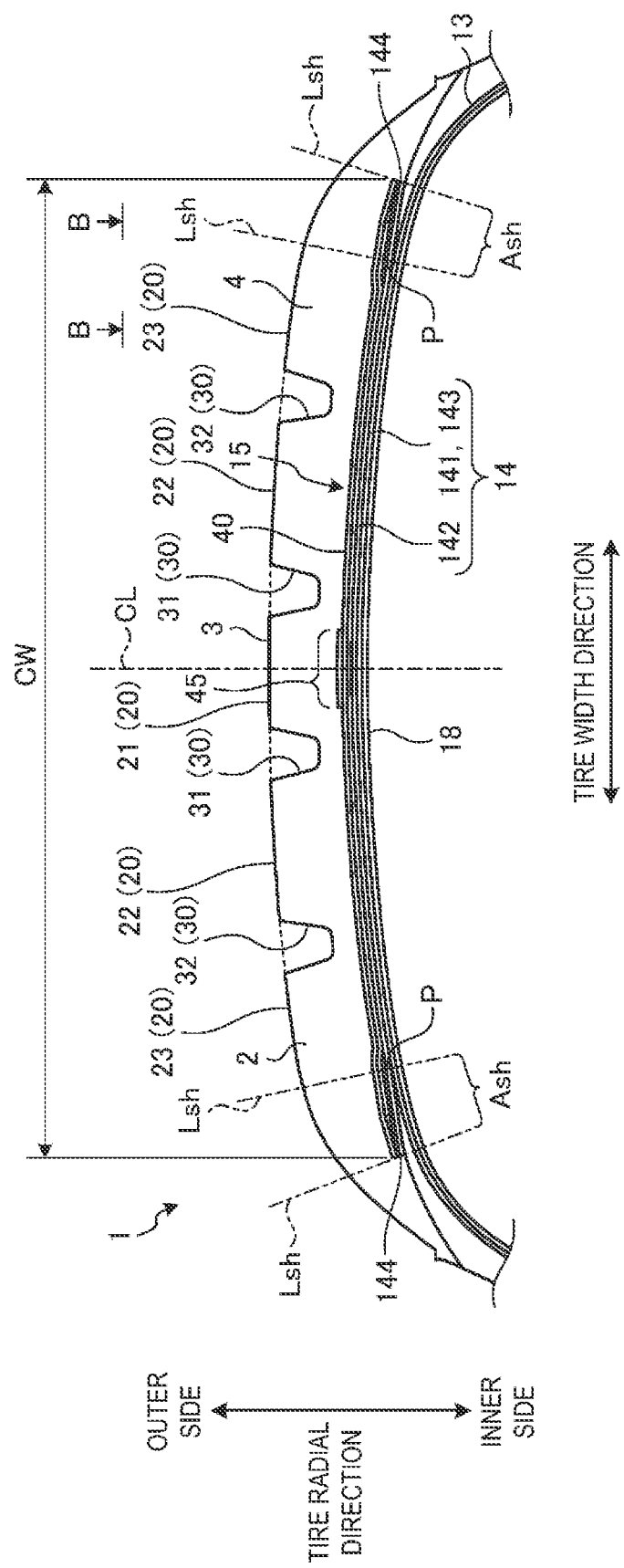
FIG. 2 is a detailed view of a tread portion illustrated in FIG. 1.
Figure 3:
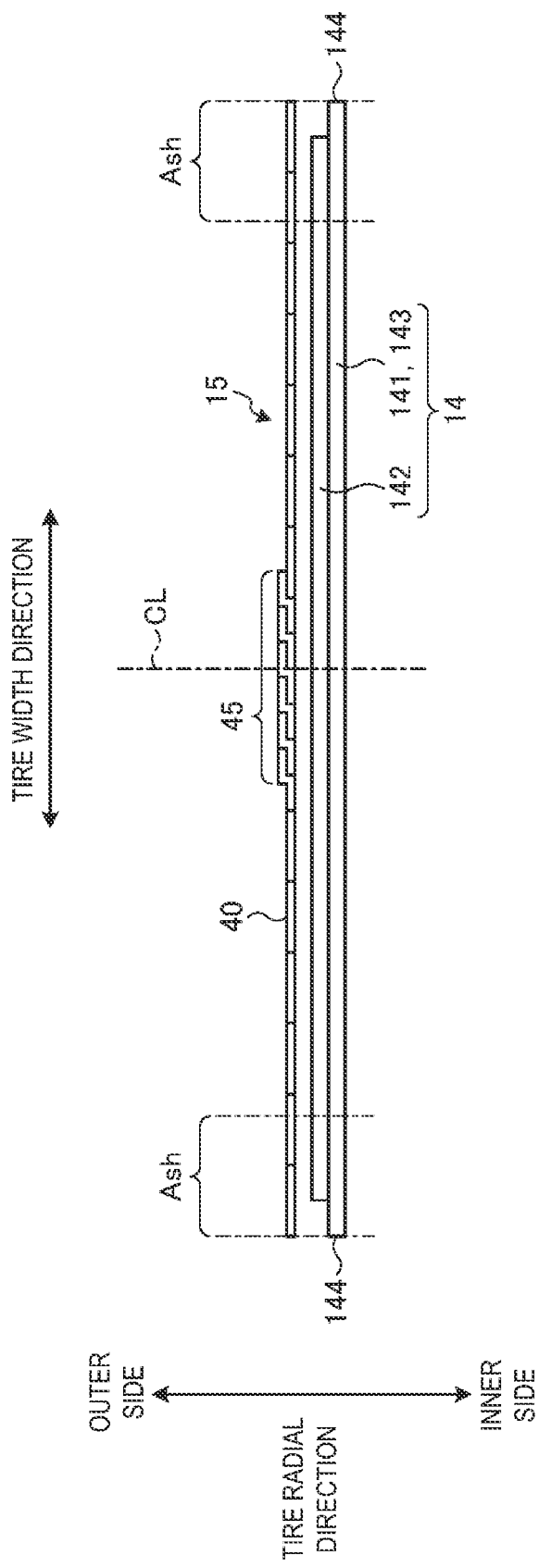
FIG. 3 is a schematic diagram of a belt layer and a belt cover layer illustrated in FIG. 2.

FIG. 2 is a detailed view of the tread portion 2 illustrated in FIG. 1. FIG. 3 is a schematic diagram of the belt layer 14 and the belt cover layer 15 illustrated in FIG. 2. The belt cover layer 15 disposed on the outer side in the tire radial direction of the belt layer 14 is formed by helically winding belt cover materials 40, which are band-like members formed in a band-like shape, on the outer side in the tire radial direction of the belt layer 14 around the tire rotation axis. The width of the belt cover material 40, corresponding to a band-like member, is within the range of 5 mm or more and 15 mm or less, and the belt cover layer 15 is formed by winding one band-like belt cover material 40 in a helical shape on an outer side of the belt layer 14 in the tire radial direction. The belt cover materials 40 are reinforcing layer constituent members constituting the belt cover layer 15, and a cord constituting the belt cover layer 15 is formed by being coated with a coating rubber.

Additionally, the belt cover layer 15 is disposed spanning between the shoulder regions Ash on both sides in the tire width direction. Thus, the belt cover layer 15 is disposed spanning the entire belt layer 14 in the tire width direction, and disposed all over the belt layer 14 in the tire width direction on the outer side of the belt layer 14 in the tire radial direction.

The shoulder region Ash in this case is a region between a position P at 85% of the width of the belt layer 14 in the tire width direction and an end portion 144 of the belt layer 14 in the tire width direction. Specifically, in a tire meridian cross-section, the shoulder region Ash is a region positioned between two shoulder region boundary lines Lsh. The shoulder region boundary lines Lsh are respective lines perpendicularly extending from the position P at 85% of the width of a widest belt 143 in the tire width direction, which has the widest width in the tire width direction among the plurality of belts 141, 142 of the belt layer 14, and the end portion 144 of the widest belt 143 to the tire inner surface 18. The shoulder regions Ash thus defined are defined on both sides of the tire equatorial plane CL in the tire width direction, and are positioned on respective both sides of the tire equatorial plane CL in the tire width direction.

In the present embodiment, of the two layers of the belts 141, 142 included in the belt layer 14, a width of the belt 141 in the tire width direction positioned on the inner side in the tire radial direction is wider than a width of the other belt 142 in the tire width direction, and the belt 141 positioned on the inner side in the tire radial direction is the widest belt 143.

Also, the positions P at 85% of the width of the widest belt 143 in the tire width direction are positions of end portions of an 85% region when a region of 85% of the width of the widest belt 143 in the tire width direction is evenly distributed on both sides in the tire width direction, with the center of the widest belt 143 in the tire width direction or the position of the tire equatorial plane CL as the center. Accordingly, intervals between the positions P at 85% of the width of the widest belt 143 in the tire width direction and the end portions 144 of the widest belt 143 are identical in size between both sides of the tire equatorial plane CL in the tire width direction.

The shoulder region Ash defined in this manner is defined by a shape in a state in which the pneumatic tire 1 is mounted on a regular rim and is inflated to the regular internal pressure. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

In addition, the belt cover layer 15 includes a lap winding portion 45 formed between the shoulder regions Ash on both sides in the tire width direction by lap-winding the belt cover material 40. The lap winding portion 45 is formed by lap-winding, in the tire radial direction, parts of circumferential portions of the belt cover material 40 wound in a helical shape, the circumferential portions being adjacent in the tire width direction. In other words, the lap winding portion 45 is formed by lap-winding, in the tire radial direction, the belt cover material 40 width-direction parts of the circumferential portions, adjacent in the tire width direction, of the belt cover material 40 wound in a helical shape.

Figure 4:
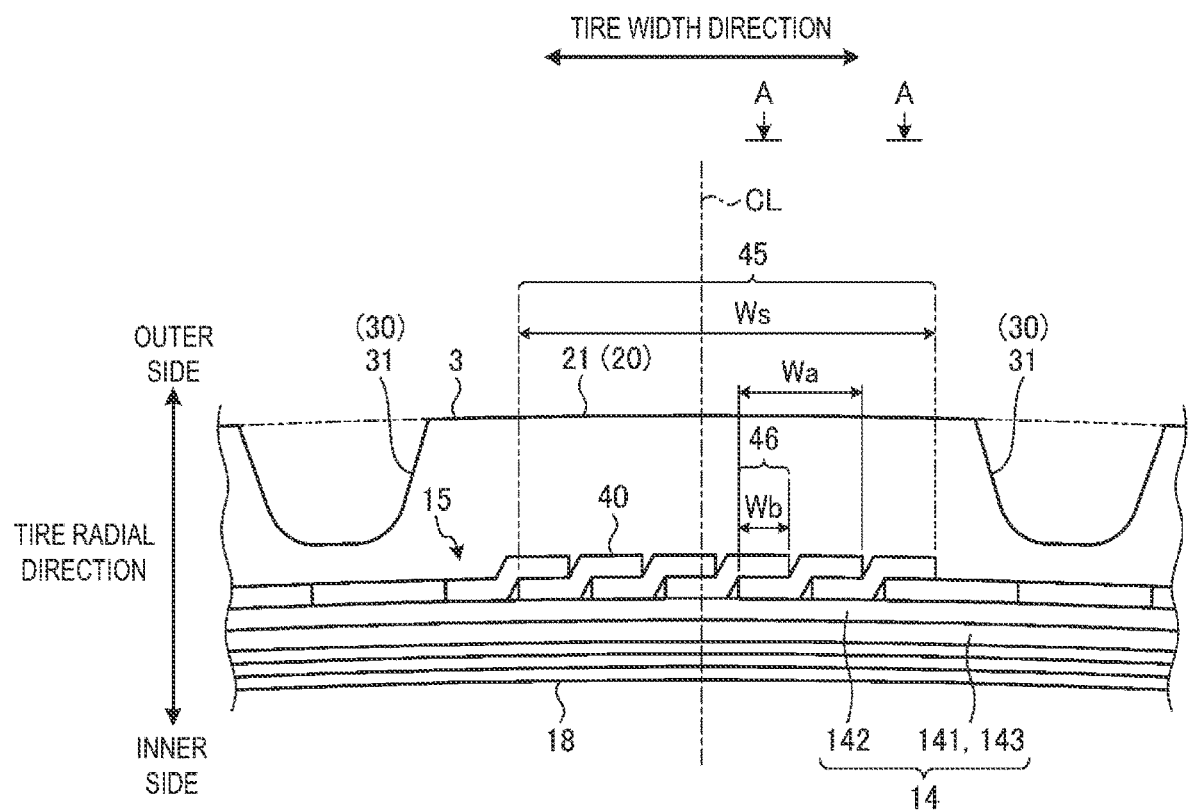
FIG. 4 is a detailed view of a center land portion illustrated in FIG. 2.

FIG. 4 is a detailed view of the center land portion 21 illustrated in FIG. 2. As illustrated in FIG. 4, the lap winding portion 45 included in the belt cover layer 15 includes lap portions 46, corresponding to a portion in which the parts of the circumferential portions, adjacent in the tire width direction, of the belt cover material 40 are lap-wound in the tire radial direction. Specifically, in the portion of the belt cover material 40 located in the lap winding portion 45, the circumferential portions adjacent in the tire width direction are lapped in the lap portions 46 in the tire radial direction. In the lap winding portion 45, the lap portions 46 of the belt cover material 40 are lapped in the tire radial direction, and thus that the belt cover material 40 is layered in two layers at the position of the lap portion 46.

The lap winding portion 45 of the belt cover layer 15 formed as described above is formed across a tire equatorial plane CL in the tire width direction. Thus, at least a part of the lap winding portion 45 is located on the inner side of the center land portion 21 in the tire radial direction. Additionally, a width Ws of the lap winding portion 45 included in the belt cover layer 15 is within the range of 3% or more and 30% or less of a width CW (see FIG. 2) of the belt cover layer 15 in the tire width direction. Specifically, the width Ws of the lap winding portion 45 is within the range of 5 mm or more and 40 mm or less.

Figure 5:
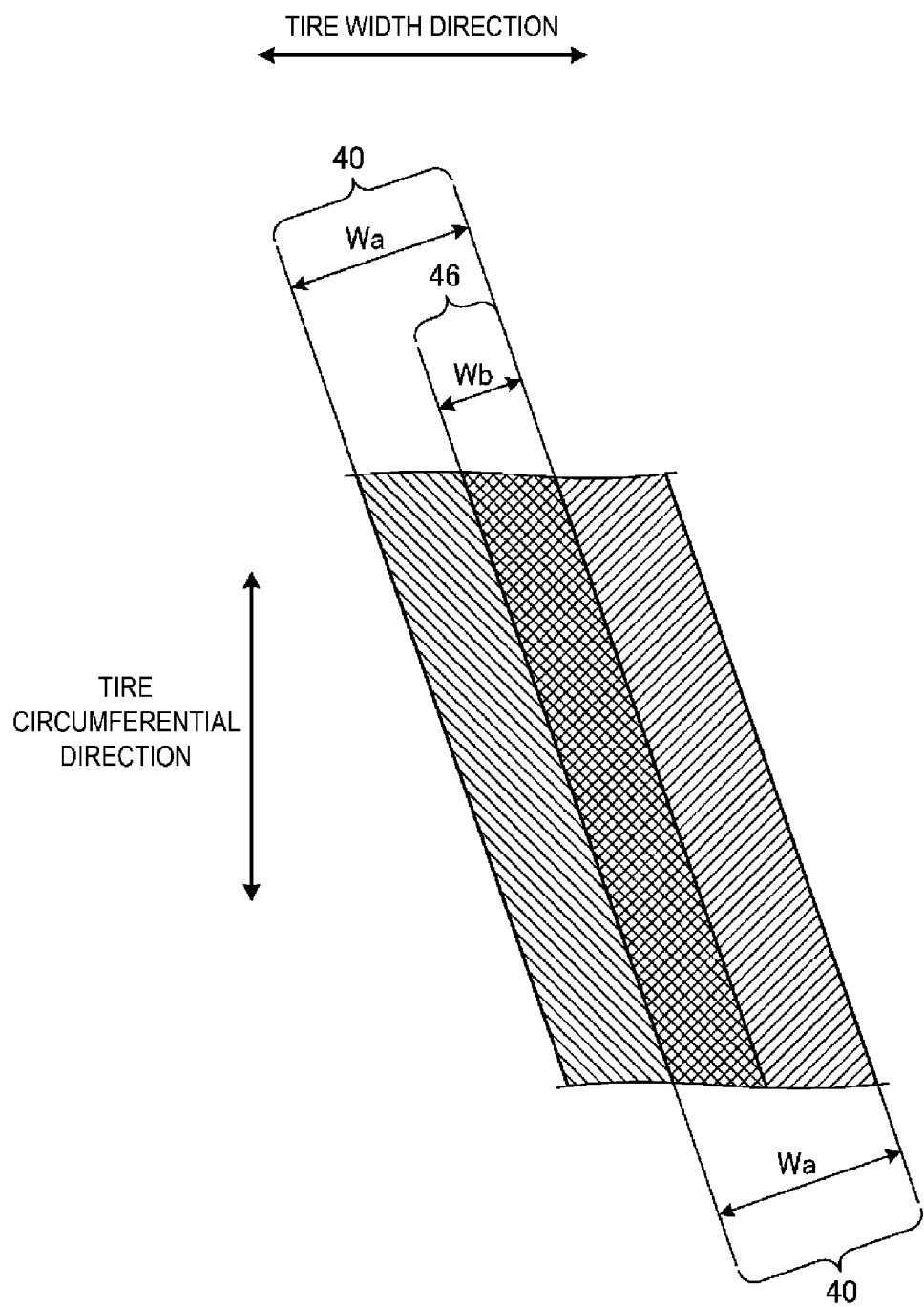
FIG. 5 is a schematic diagram of a belt cover material located in a lap winding portion of a belt cover layer in a direction of arrows A-A in FIG. 4.

FIG. 5 is a schematic diagram of the belt cover material 40 located in the lap winding portion 45 of the belt cover layer 15 in the direction of arrows A-A in FIG. 4. A width Wb of the lap portions 46 included in the lap winding portion 45 of the belt cover layer 15 is within the range of 20% or more and 70% or less of a width Wa of the belt cover material 40. In other words, in the portion of the belt cover material 40 located in the lap winding portion 45, the circumferential portions adjacent in the tire width direction are lapped in the tire radial direction such that the width Wb is within the range of 20% or more and 70% or less of the width Wa of the belt cover material 40.

Figure 6:
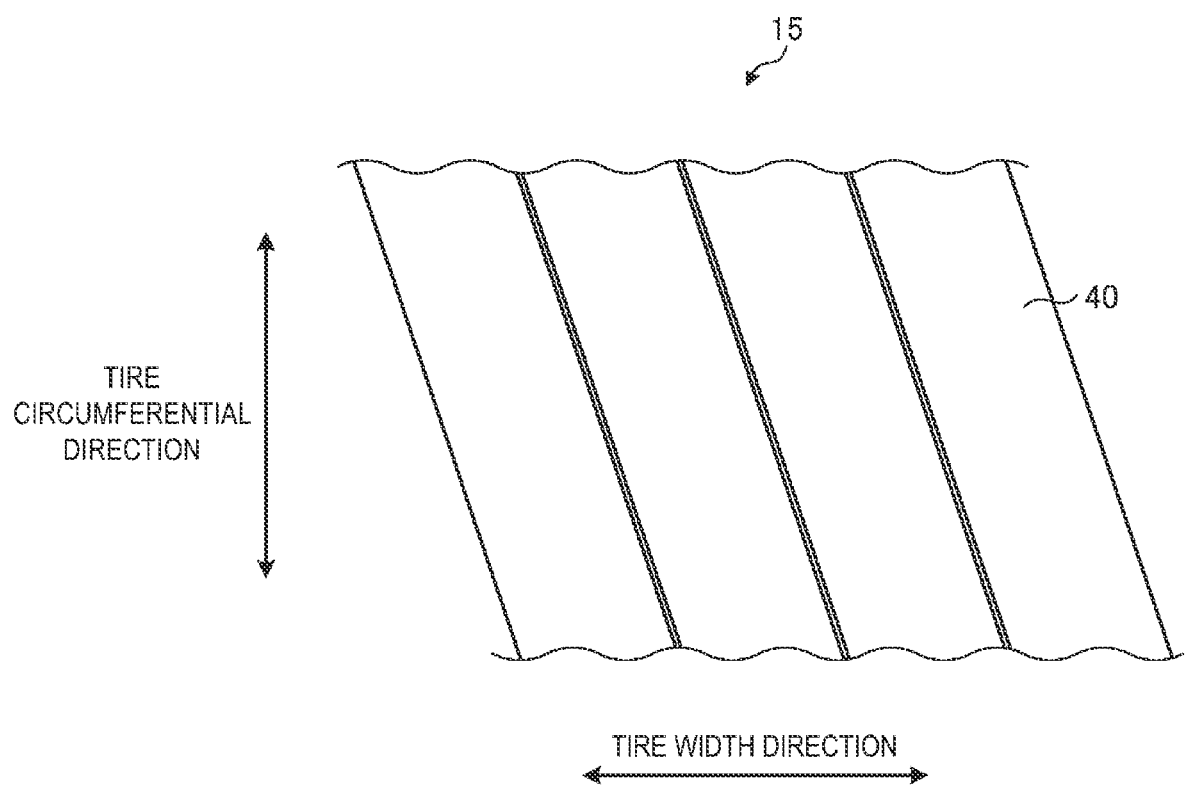
FIG. 6 is a schematic diagram of a belt cover material located in a shoulder region Ash in the belt cover layer in a direction of arrows B-B in FIG. 2.

FIG. 6 is a schematic diagram of the belt cover material 40 of the belt cover layer 15 located in the shoulder region Ash in the direction of arrows B-B in FIG. 2. In the portions, other than the lap winding portion 45, of the belt cover material 40 forming the belt cover layer 15, the belt cover material 40 is wound such that the circumferential portions, adjacent in the tire width direction, of the belt cover material 40 wound in a helical shape are placed in close proximity to or in contact with each other, instead of being lapped in the tire radial direction. Thus, in the portion of the belt cover layer 15 located in the shoulder region Ash, the belt cover layer 15 is wound such that the circumferential portions, adjacent in the tire width direction, of the belt cover material 40 wound in a helical shape are placed in close proximity to or in contact with each other instead being lapped in the tire radial direction. In other words, at the positions other than the lap winding portion 45 but including the portions located in the shoulder regions Ash, the belt cover layer 15 is formed of a single layer belt cover material 40.

Method for Manufacturing Pneumatic Tire

Next, the manufacturing method for the pneumatic tire 1 according to the embodiment will be described. To manufacture the pneumatic tire 1, first, processing is performed on each of the members constituting the pneumatic tire 1, and the processed members are assembled. That is, the rubber members, such as the tread rubber layer 4, and the respective members, such as the bead core 11, the carcass layer 13, the belt layer 14, and the belt cover layer 15 are each processed and the processed members are assembled. Of these, the belt cover layer 15 is disposed on the outer side in the tire radial direction of the belt layer 14 by helically winding the band-like belt cover materials 40 on the outer side of the belt layer 14 in the tire radial direction around the tire rotation axis.

Figure 7:
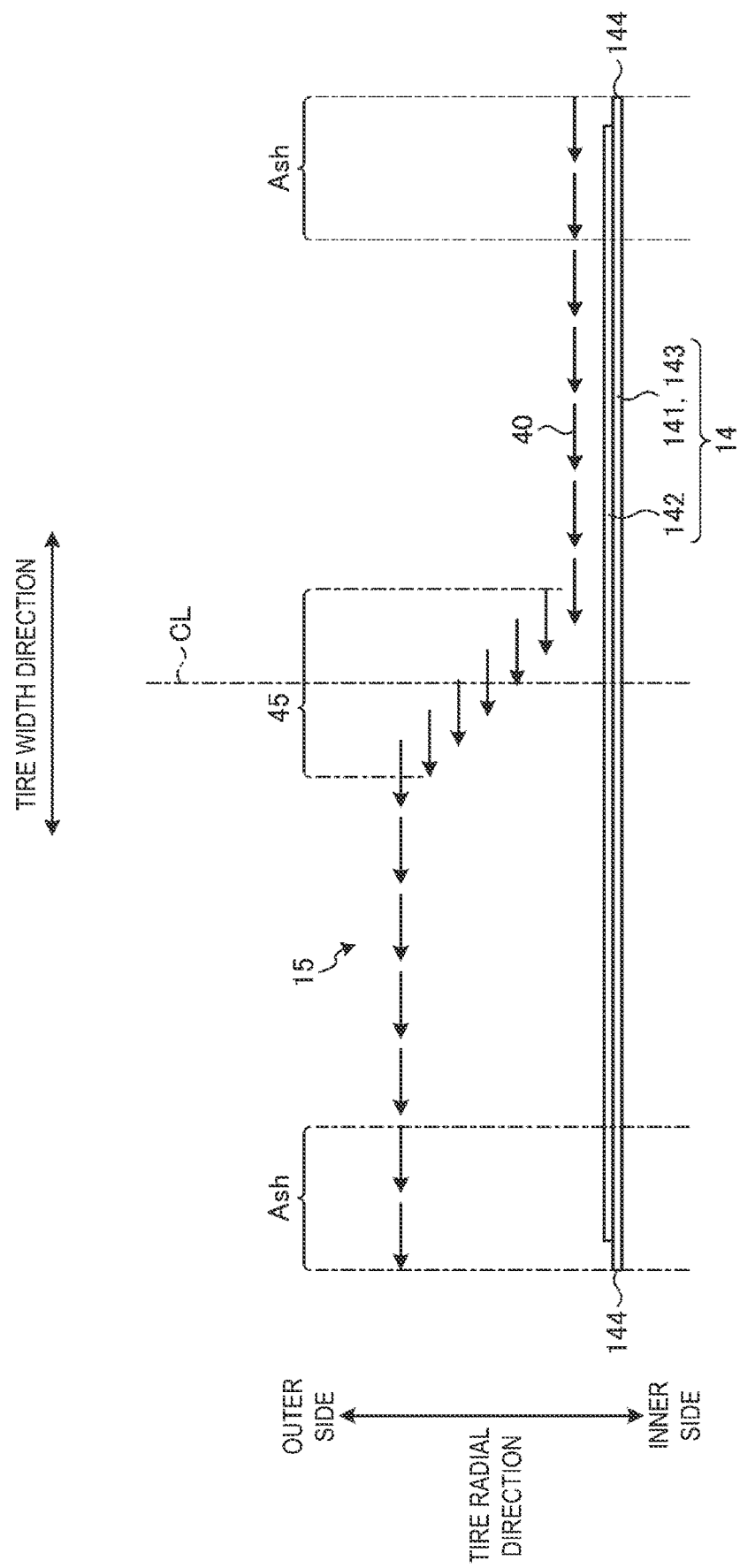
FIG. 7 is a schematic diagram illustrating winding of the belt cover material.

FIG. 7 is a schematic view illustrating winding of the belt cover material 40. In the step of disposing the belt cover layer 15 on the outer side of the belt layer 14 in the tire radial direction, one belt cover material 40 is wound in a helical shape spanning between the shoulder regions Ash on both sides in the tire width direction. Thus, the belt cover layer 15 is formed between the shoulder regions Ash. In other words, in a case where the belt cover layer 15 is disposed on the outer side of the belt layer 14 in the tire radial direction, one belt cover material 40 formed of a band-like member is wound in a helical shape on the outer side of the belt layer in the tire radial direction from one shoulder region Ash side to the other shoulder region Ash side, in the shoulder regions Ash respectively located on both sides in the tire width direction.

The lap winding 45 included in the belt cover layer 15 is formed in the middle of the step of winding the belt cover material 40 in a helical shape spanning between the shoulder regions Ash on both sides in the tire width direction. In other words, the step of forming the lap winding 45 is included in the step of forming the belt cover layer 15. In the step of forming the belt cover layer 15 between the shoulder regions Ash, the manner of winding the belt cover material 40 in forming the portions other than the lap winding portion 45 differs from the manner of winding the belt cover material 40 in forming the lap winding portion 45.

Specifically, in the step of forming the belt cover layer 15 between the shoulder regions Ash, in the portions other than the lap winding portion 45, the belt cover layer 40 is wound in a helical shape such that the circumferential portions, adjacent in the tire width direction, of the belt cover material 40 wound in a helical shape are placed in close proximity to or in contact with each other instead of being lapped in the tire radial direction. Thus, in the portions located in the shoulder regions Ash as well, the belt cover layer 15 is formed by winding the belt cover layer 40 in a helical shape such that the circumferential portions, adjacent in the tire width direction, of the belt cover material 40 wound in a helical shape are placed in close proximity to or in contact with each other instead of being lapped in the tire radial direction.

Specifically, in the step of forming the belt cover layer 15, in a case where the belt cover material 40 is wound in a helical shape in order to form the portions other than the lap winding portion 45, the belt cover material 40 is wound in a helical shape at a pitch approximately identical to the width of the belt cover material 40. In other words, in a case where the belt cover material 40 is wound in a helical shape, the belt cover material 40 is wound using a pitch at which the adjacent circumferential portions do not overlap and are not substantially spaced apart from each other. Thus, the belt cover material 40 is most preferably wound such that edge portions of the adjacent circumferential portions contact each other, and in a case where the adjacent circumferential portions are spaced apart from each other, the distance between the circumferential portions is preferably 3 mm or less. Note that in the belt cover material 40, the adjacent circumferential portions may slightly overlap, and in a case where the adjacent circumferential portions overlap, the width of the overlapping portion is preferably within 3 mm or less. When the width of the overlapping portion between the adjacent circumferential portions of the belt cover material 40 is 3 mm or less, in the present embodiment, the adjacent circumferential portions are considered not to substantially overlap, and are not included in the lap portions 46.

On the other hand, in the step of forming the lap winding portion 45, between the shoulder regions Ash on both sides in the tire width direction, parts of the circumferential portions, adjacent in the tire width direction, of the belt cover material 40 wound in a helical shape is lap-wound in the tire radial direction to form the lap winding portion 45 between the shoulder regions Ash on both sides in the tire width direction. Specifically, in a case where the belt cover material 40 is wound in a helical shape in the step of forming the lap winding portion 45, the belt cover material 40 is wound in a helical shape at a pitch smaller than the width of the belt cover material 40. Thus, the belt cover material 40 is wound in a helical shape with the adjacent circumferential portions of the belt cover material 40 lapped in the tire radial direction, forming the lap winding portion 45. Additionally, in the present embodiment, the lap winding portion 45 is formed at a position across the tire equatorial plane CL in the tire width direction.

In this manner, in the step of lap-winding the belt cover material 40 to form the lap winding portion 45, the lap winding portion 45 is formed such that the width Ws (see FIG. 4) of the lap winding portion 45 in the tire width direction is within the range of 3% or more and 30% or less of the width CW of the belt cover layer 15 in the tire width direction (see FIG. 2). Specifically, in the step of forming the lap winding portion 45, the lap winding portion 45 is formed such that the width Ws of the lap winding portion 45 in the tire width direction is within the range of 5 mm or more and 40 mm or less. Additionally, in the step of forming the lap winding portion 45, the belt cover material 40 is wound with parts of the circumferential portions adjacent in the tire width direction being lapped in the tire radial direction such that the width Wb of the lap portion 46 included in the lap winding portion 45 (see FIGS. 4 and 5) is within the range of 20% or more and 70% or less of the width Wa of the belt cover material 40 (see FIGS. 4 and 5).

In the step of forming the belt cover layer 15 between the shoulder regions Ash, one belt cover material 40 is wound in a helical shape from one shoulder region Ash side toward the other shoulder region Ash side with the circumferential portions adjacent in the tire width direction not being lapped in the tire radial direction. In response to arrival at the portion in which the lap winding portion 45 is to be formed in the middle of winding the belt cover material 40, the belt cover material 40 is wound with parts of the circumferential portions adjacent in the tire width direction being lapped in the tire radial direction. In response to passage of the portion in which the lap winding portion 45 is to be formed by winding the belt cover material 40 from one shoulder region Ash side toward the other shoulder region Ash side, the circumferential portions adjacent in the tire width direction are wound in a helical shape again without being lapped in the tire radial direction. In the method of manufacturing the pneumatic tire 1 according to the present embodiment, the belt cover layer 15 including the lap winding portion 45 with the belt cover material 40 layered in the tire radial direction is formed using one belt cover material 40.

Functions and Effects

To mount the pneumatic tire 1 according to the present embodiment on a vehicle, a rim wheel R (see FIG. 8) is fitted to the bead portion 10 to mount the pneumatic tire 1 on the rim wheel R, and then the pneumatic tire 1 is inflated by being filled with air and is mounted on the vehicle. The pneumatic tire 1 according to the present embodiment is, for example, the pneumatic tire 1 that can accommodate use at high loads, such as the pneumatic tire 1 with EXTRA LOAD standard. As such, the pneumatic tire 1 can be used with an air pressure at inflation in a relatively high state. Thus, when the pneumatic tire 1 is used at a high load, the pneumatic tire 1 is used at an increased air pressure. When the vehicle equipped with the pneumatic tires 1 travels, the pneumatic tire 1 rotates with the ground contact surface 3 at a portion positioned on a lower side in the ground contact surface 3 in contact with the road surface. The vehicle is driven by transferring a driving force or a braking force to the road surface, using the frictional force between the ground contact surface 3 and the road surface, or by generating a turning force.

For example, in a case where the vehicle on which the pneumatic tires 1 are mounted travels on a dry road surface, the vehicle travels mainly by transmitting a driving force or a braking force to the road surface or generating a turning force by a frictional force between the ground contact surface 3 and the road surface. When the vehicle travels on a wet road surface, the vehicle travels in such a way that water between the ground contact surface 3 and the road surface enters grooves, such as the main grooves 30 and the lug grooves, and the water between the ground contact surface 3 and the road surface is drained through these grooves. Accordingly, the ground contact surface 3 is easily grounded on the road surface, and the frictional force between the ground contact surface 3 and the road surface allows the vehicle to travel as desired.

Additionally, while the vehicle is traveling, the pneumatic tire 1 is subjected to a load associated with a weight of a vehicle body, acceleration/deceleration, and turning. Accordingly, a large load acts in the tire radial direction. This load is mainly received by air filled into the pneumatic tire 1, but is also received by the tread portion 2 and the sidewall portion 8 as well as the air inside the pneumatic tire 1. That is, the sidewall portion 8 transmits the load between the bead portion 10 to which the rim wheel R is fitted and the tread portion 2, and the tread portion 2 transmits the load between the sidewall portion 8 and the road surface. Accordingly, the large load acts on the sidewall portion 8 and the tread portion 2 while the vehicle is traveling, and the sidewall portion 8 and the tread portion 2 receive this load while deflecting mainly in the tire radial direction.

Additionally, while the vehicle is traveling, the pneumatic tire 1 rotates, so the position in the ground contact surface 3 that comes into contact with the road surface continuously moves in the tire circumferential direction. In accordance with this, the positions in the sidewall portion 8 and the tread portion 2 deflected by the load while the vehicle is traveling also move in the tire circumferential direction. Thus, while the vehicle is traveling, the pneumatic tire 1 rotates while repeating the sequential deflection of the respective positions of the sidewall portion 8 and the tread portion 2 on the tire circumferential direction.

Additionally, a projection projecting from a road surface, such as a stone, is possibly present on a road surface on which the vehicle travels, and the vehicle during traveling possibly treads such a projection by the tread portion 2 of the pneumatic tire 1. At this time, when the sidewall portion 8 and the tread portion 2 have a small deflection due to the high air pressure filled in the pneumatic tire 1, the pneumatic tire 1 cannot absorb the change in the shape of the road surface due to the presence of the projection, and the projection possibly penetrates the tread portion 2 of the pneumatic tire 1. That is, in the pneumatic tire 1 with the increased internal pressure, when the projection on the road surface is trodden, the small deflection of the sidewall portion 8 and the tread portion 2 causes the projection to penetrate the tread portion 2, possibly causing a shock burst.

Figure 8:
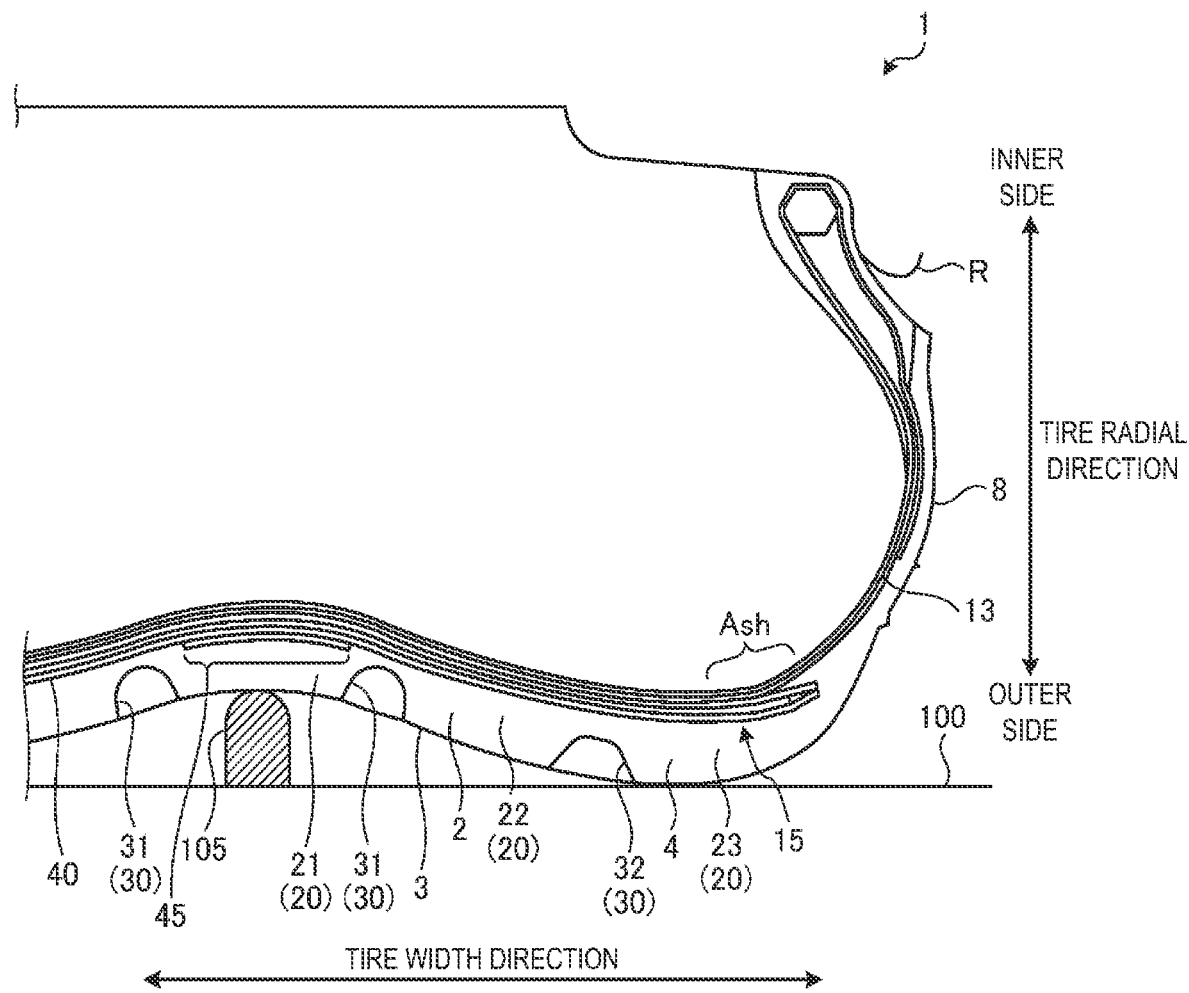
FIG. 8 is an explanatory diagram illustrating a state in which a projection on a road surface is trodden by the pneumatic tire according to an embodiment.

In contrast, in the pneumatic tire 1 according to the present embodiment, the belt cover layer 15 is formed by winding one band-like belt cover material 40 in a helical shape, and the belt cover layer 15 includes the lap winding portion 45 between the shoulder regions Ash on both sides in the tire width direction, and thus shock bursts can be suppressed in a case where the internal pressure is increased. FIG. 8 is an explanatory diagram illustrating a state in which a projection 105 on a road surface 100 is trodden by the pneumatic tire 1 according to the embodiment. In the pneumatic tire 1 according to the present embodiment, the belt cover layer 15 includes the lap winding portion 45 with parts of the circumferential portions adjacent in the tire width direction being lapped in the tire radial direction, thus allowing the formation, between the shoulder regions Ash, of a portion including more lapped portions of the belt cover material 40 and having a higher strength, than the other portions. In other words, at the positions other than the lap portions 46 of the overlap winding portion 45 in the belt cover layer 15, the belt cover layer 15 is formed of one layer of the belt cover material 40, whereas at the positions of the lap portions 46 of the lap winding portion 45, the belt cover layer 15 is formed of two layers of the belt cover material 40. This allows the strength of the lap winding portion 45 in the belt cover layer 15 to be made higher than the strength of the portions other than the lap winding portion 45. This increases the strength at break of the central region of the tread portion 2 in the tire width direction. Even when the projection 105 on the road surface 100 is trodden at or near the center land portion 21 where a ground contact pressure is likely to increase, the penetration of the projection 105 through the tread portion 2 can be suppressed. Accordingly, shock bursts caused by the projection 105 being trodden during traveling of the vehicle can be suppressed.

In addition, in the portion of the belt cover layer 15 located in the shoulder region Ash, the belt cover material 40 is wound in the tire radial direction with the circumferential portions, adjacent in the tire width direction, of the belt cover material 40 wound in a helical shape not being lapped. Thus, even in a case where shock burst resistance is improved using the belt cover material 40, an unnecessarily high strength of the shoulder region Ash in the tread portion can be suppressed. This enables the shoulder region Ash to be easily deformed in a case where the projection 105 is trodden in a central region of the tread portion 2 in the tire width direction, allowing the shoulder region Ash to be easily deformed in the direction in which the central region of the tread portion 2 in the tire width direction leaves the road surface 100. Thus, the pressure applied to the tread portion 2 by the projection 105 can be reduced, allowing suppression of penetration of the tread portion 2 by the projection 105. Accordingly, shock bursts caused by the projection 105 being trodden during traveling of the vehicle can be suppressed.

Additionally, the belt cover layer 15 is formed by winding one belt cover material 40 in a helical shape, and the portion of the belt cover layer 15 that is to have an increased strength includes the lap winding portion 45 in which parts of the circumferential portions, adjacent in the tire width direction, of the belt cover material 40 wound in a helical shape are lap-wound in the tire radial direction. Thus, the belt cover layer 15 can be easily formed using one belt cover material 40, and the strength of a part of the belt cover layer 15 can be easily increased. Accordingly, productivity can be improved in a case where shock burst resistance is improved by using the belt cover layer 15.

Additionally, in the portion of the belt cover layer 15 located in the shoulder region Ash, the belt cover material 40 is wound with the adjacent circumferential portions not lapped in the tire radial direction, whereas between the shoulder regions Ash on both sides in the tire width direction, the belt cover material 40 is wound with the lap portions 46 formed. This allows the strength of the belt cover layer 15 to be easily varied using one belt cover material 40 depending on the position in the tire width direction. This allows more reliable improvement in the productivity in a case where the strength of the belt cover layer 15 is easily varied depending on the position in the tire width direction.

Additionally, the width Ws of the lap winding portion 45 of the belt cover layer 15 in the tire width direction is within the range of 3% or more and 30% or less of the width CW of the belt cover layer 15 in the tire width direction. This enables an increase in strength at break of the central region of the tread portion 2 in the tire width direction, which is likely to receive an increased ground contact pressure, with a decrease in productivity suppressed in a case where the belt cover layer 15 is formed by winding the belt cover material 40 in a helical shape. In other words, when the width Ws of the lap winding portion 45 is less than 3% of the width CW of the belt cover layer 15, the width Ws of the lap winding portion 45 is excessively small, and thus the strength at the position of the lap winding portion 45 in the belt cover layer 15 may be difficult to ensure. In this case, even in a case where the lap winding portion 45 is formed in the belt cover layer 15, the strength at break of the central region of the tread portion 2 in the tire width direction is difficult to increase, and this may lead to difficulty in suppressing penetration of the tread portion 2 by the projection 105 trodden by the tread portion 2. In addition, when the width Ws of the lap winding portion 45 is greater than 30% of the width CW of the belt cover layer 15, the width Ws of the lap winding portion 45 is excessively large, and this may excessively increase the range of the belt cover material 40 in which the circumferential portions, adjacent in the tire width direction, of the belt cover material 40 are lapped in the tire radial direction. This may be likely to reduce the productivity. In other words, in a case where the circumferential portions, adjacent in the tire width direction, of the belt cover material 40 are lapped in the tire radial direction, speed that is involved in winding the belt cover material 40 in a helical shape decreases to gradually form the belt cover layer 15 in the tire width direction. Thus, with an increased range in which the circumferential portions adjacent in the tire width direction are lapped in the tire radial direction, the increased range is correspondingly likely to reduce the productivity. Thus, in a case where the circumferential portions, adjacent in the tire width direction, of the belt cover material 40 are excessively large in the tire radial direction, the productivity may be likely to be degraded.

In contrast, when the width Ws of the lap winding portion 45 is within the range of 3% or more and 30% or less of the width CW of the belt cover layer 15, the strength of the lap winding portion 45 can be more reliably ensured, with suppression of an excessive increase in the range in which the circumferential portions, adjacent in the tire width direction, of the belt cover material 40 are lapped in the tire radial direction. Accordingly, with a decrease in productivity suppressed in a case where the belt cover material 40 is wound in a helical shape to form the belt cover layer 15, the strength at break of the central region of the tread portion 2, which is likely to receive an increased ground contact pressure, can be more reliably increased. As a result, both shock burst resistance performance and productivity can be achieved in a compatible manner.

Additionally, since the width Ws of the lap winding portion 45 is within the range of 5 mm or more and 40 mm or less, with an excessive increase in the weight of the belt cover layer 15 suppressed, the strength of the lap winding portion 45 can be more reliably ensured. In other words, when the width Ws of the lap winding portion 45 is less than 5 mm, the width Ws of the lap winding portion 45 is excessively small. Thus, the strength of the lap winding portion 45 may be difficult to ensure. In this case, even with the lap winding portion 45 formed, the strength at break of the central region of the tread portion 2 in the tire width direction is difficult to increase effectively, and this may lead to difficulty in effectively suppressing penetration of the tread portion 2 by the projection 105 trodden by the tread portion 2. Additionally, when the width Ws of the lap winding portion 45 is greater than 40 mm, the width Ws of the lap winding portion 45 is excessively large, and thus the belt cover material 40 used may be excessively large. In this case, the weight of the belt cover layer 15 may be excessively increased, and this may lead to an excessive increase in weight of the pneumatic tire 1 due to provision of the lap winding portion 45.

In contrast, when the width Ws of the lap winding portion 45 is within the range of 5 mm or more and 40 mm or less, with an excessive increase in the weight of the belt cover layer 15 suppressed, the strength of the lap winding portion 45 can be more reliably ensured. This enables a more reliable increase in the strength at break of the central region of the tread portion 2 in the tire width direction, which is likely to receive an increased ground contact pressure. As a result, while the increase in the weight of the pneumatic tire 1 is suppressed, shock burst resistance performance can be improved.

Additionally, because the lap winding portion 45 is disposed across the tire equatorial plane CL in the tire width direction, this allows for a reliable increase in the strength at break of the position of the tread portion 2 that is likely to receive an increased ground contact pressure while the vehicle is traveling. As a result, the shock burst when the projection 105 on the road surface 100 is trodden can be more reliably suppressed. As a result, it is possible to improve shock burst resistance performance more reliably.

In addition, the width Wb of the adjacent lap portion 46 in the width direction of the belt cover material 40 is within the range of 20% or more and 70% or less of the width Wa of the belt cover material 40. Accordingly, shock bursts can be more reliably suppressed, with an excessive increase in the weight of the belt cover layer 15 suppressed. In other words, even with the lap winding portion 45 formed, in a case where the width Wb of the adjacent lap portion 46 is less than 20% of the width Wa of the belt cover material 40, the strength at break of the tread portion 2 may be difficult to increase effectively, compared to a case where the lap winding portion 45 is not formed. In this case, even with the lap winding portion 45 with the lap portions 46 formed in the belt cover layer 15, the effect of suppressing shock bursts by forming the lap winding portion 45 may be difficult to produce. In addition, when the width Wb of the lap portion 46 is greater than 70% of the width Wa of the belt cover material 40, the width Wb of the adjacent lap portion 46 is excessively large. This may lead to an excessively large size of the belt cover material 40. In this case, the weight of the belt cover layer 15 is possibly excessively increased, which possibly causes the excessive increase in the weight of the pneumatic tire 1.

In contrast, when the width Wb of the adjacent lap portion 46 is within the range of 20% or more and 70% or less of the width Wa of the belt cover material 40, with an excessive increase in the weight of the belt cover layer 15 suppressed, the lap winding portion 45 enables a reliable increase in the strength at break of the central region of the tread portion in the tire width direction, allowing shock bursts to be more reliably suppressed. As a result, while the increase in the weight of the pneumatic tire 1 is suppressed, shock burst resistance performance can be improved.

In addition, in the method of manufacturing the pneumatic tire 1 according to the present embodiment, in a case where one belt cover layer 40 is used to form the belt cover layer 15 spanning between the shoulder regions Ash on both sides in the tire width direction, parts of the circumferential portions, adjacent in the tire width direction, of the belt cover layer 40 are lapped in the tire radial direction to form the lap winding portion 45. This allows the formation, between the shoulder regions Ash, of a portion including more lapped portions of the belt cover material 40 and having a higher strength, than the other portions. This increases a strength at break at or near the center in the tire width direction of the tread portion 2. Even when the projection 105 on the road surface 100 is trodden at or near the center land portion 21 where a ground contact pressure is likely to increase, the penetration of the projection 105 through the tread portion 2 can be suppressed. Accordingly, shock bursts caused by the projection 105 being trodden during traveling of the vehicle can be suppressed.

In addition, in the portion of the belt cover layer 15 located in the shoulder region Ash, the belt cover material 40 is wound such that the circumferential portions, adjacent in the tire width direction, of the belt cover material 40 are wound in the tire width direction without being lapped in the tire radial direction. Thus, even in a case where shock burst resistance is improved using the belt cover material 40, more than necessary increase in the strength of the shoulder region Ash of the tread portion 2 can be suppressed. Accordingly, the shoulder region Ash can be configured to be easily deformed in a case where the projection 105 is trodden by the central region of the tread portion 2, allowing the shoulder region Ash to be easily deformed in the direction in which the central region of the tread portion 2 in the tire width direction leaves the road surface 100. Thus, the pressure applied to the tread portion 2 by the projection 105 can be reduced, allowing suppression of penetration of the tread portion 2 by the projection 105. This allows shock bursts to be more reliably suppressed.

Additionally, the belt cover layer 15 is formed by winding one belt cover material 40 in a helical shape, and by lap-winding parts of the circumferential portions, adjacent in the tire width direction, of the belt cover layer 40 wound in a helical shape to form the lap winding portion 45, a portion increasing the strength of the belt cover layer 15 is formed between the shoulder regions Ash. Accordingly, the belt cover layer 15 can be easily formed using one belt cover material 40, and the strength of a part of the belt cover layer 15 can be easily increased. Consequently, the productivity can be increased in a case where shock burst resistance is improved using the belt cover layer 15.

In addition, in the portion of the belt cover layer 15 located in the shoulder region Ash, the belt cover material 40 is wound with the circumferential portions, adjacent in the tire width direction, of the belt cover material 40 not being lapped in the tire radial direction, and between the shoulder regions Ash on both sides in the tire width direction, the belt cover material 40 is wound with the lap portions 46 formed. This allows the strength of the belt cover layer 15 to be easily varied using one belt cover material 40 depending on the position in the tire width direction. This allows more reliable improvement in the productivity in a case where the strength of the belt cover layer 15 is easily varied depending on the position in the tire width direction.

Additionally, in the step of forming the lap winding portion 45, the width Ws of the lap winding portion 45 in the tire width direction is within the range of 3% or more and 30% or less of the width CW of the belt cover layer 15 in the tire width direction. Thus, with a decrease in productivity suppressed in a case where the belt cover material 40 is wound in a helical shape to form the belt cover layer 15, the strength at break of the central region of the tread portion 2, which is likely to receive an increased ground contact pressure, can be more reliably increased. In other words, when the width Ws of the lap winding portion 45 is less than 3% of the width C W of the belt cover layer 15, the width Ws of the lap winding portion 45 is excessively small, and thus the strength at the position of the lap winding portion 45 in the belt cover layer 15 may be difficult to ensure. In this case, the strength at break of the central region of the tread portion 2 in the tire width direction is difficult to increase, and this may lead to difficulty in suppressing penetration of the tread portion 2 by the projection 105 trodden by the tread portion 2. In addition, when the width Ws of the lap winding portion 45 is greater than 30% of the width CW of the belt cover layer 15, the width Ws of the lap winding portion 45 is excessively large, and this may excessively increase the range of the belt cover material 40 in which the circumferential portions, adjacent in the tire width direction, of the belt cover material 40 are lapped in the tire radial direction. In this case, with an increased range in which the circumferential portions adjacent in the tire width direction are lapped in the tire radial direction, the increased range is correspondingly likely to reduce production speed in a case where the belt cover material 40 is wound in a helical shape to form the belt cover layer 15. This may be likely to reduce the productivity.

In contrast, when the width Ws of the lap winding portion 45 is within a range of 3% or more and 30% or less of the width CW of the belt cover layer 15, the strength of the lap winding portion 45 can be more reliably ensured, with suppression of an excessive increase in the range in which the circumferential portions, adjacent in the tire width direction, of the belt cover material 40 are lapped in the tire radial direction. Accordingly, with a decrease in productivity suppressed in a case where the belt cover layer 15 is formed, the strength at break of the central region of the tread portion 2, which is likely to receive an increased ground contact pressure, can be more reliably increased. As a result, both shock burst resistance performance and productivity can be achieved in a compatible manner.

Modified Examples

Figure 9:
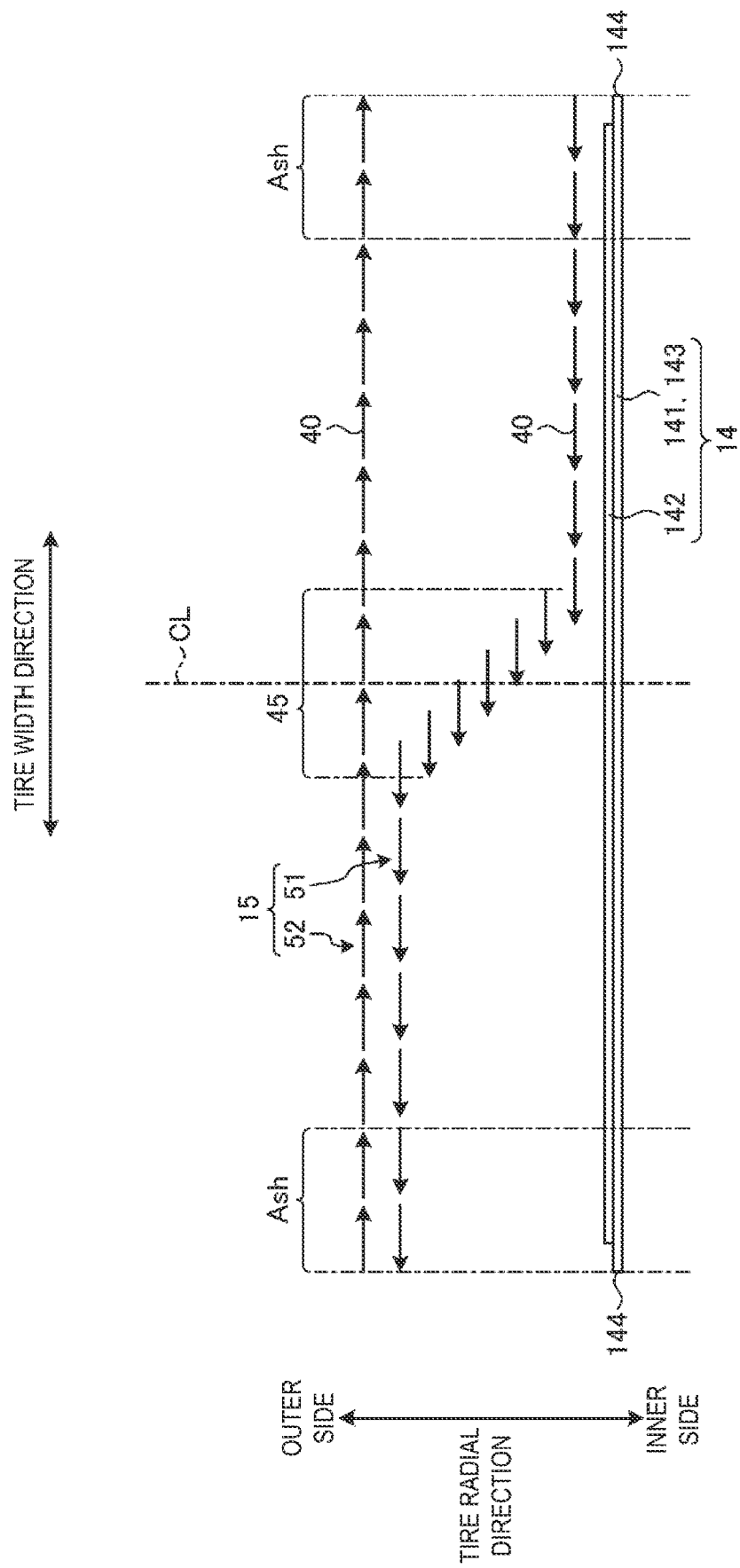
FIG. 9 is an explanatory diagram of a modified example of the pneumatic tire according to an embodiment, in which the belt cover layer includes a plurality of full cover layers.

Note that in the embodiments described above, the belt cover layer 15 is formed as a full cover layer completely covering the belt layer 14 in the tire width direction but that the belt cover layer 15 may include a plurality of full cover layers. FIG. 9 is an explanatory diagram of a modified example of the pneumatic tire 1 according to the embodiment, in which the belt cover layer 15 includes a plurality of the full cover layers. In a case where a first full cover layer 51 refers to a full cover layer including the lap winding portion 45 and formed spanning between the shoulder regions Ash on both sides in the tire width direction, the belt cover layer 15 may include a second full cover layer 52 stacked on the first full cover layer 51 in the tire radial direction and formed spanning between the shoulder regions Ash on both sides in the tire width direction. In this case, preferably, the first full cover layer 51 and the second full cover layer 52 are formed by winding one belt cover material 40 in a helical shape, and the second full cover layer 52 is stacked on the outer side of the first full cover layer in the tire radial direction by winding the circumferential portions, adjacent in the tire width direction, of the belt cover material 40, in the tire radial direction without lapping the circumferential portions in the tire radial direction.

Specifically, similarly to the belt cover layer 15 of the embodiments described above, the first full cover layer 51 is formed by winding one belt cover material 40 in a helical shape between the shoulder regions Ash on both sides in the tire width direction, and the lap winding portion 45 with parts of the circumferential portions, adjacent in the tire width direction, of the belt cover material 40 being lap-wound in the tire radial direction is formed between the shoulder regions Ash on both sides in the tire width direction. In other words, the first full cover layer 51 is formed by winding one belt cover material 40 in a helical shape from one shoulder region Ash side toward the other shoulder region Ash side. The second full cover layer is formed by, after winding the belt cover material 40 up to the other shoulder region Ash side to form the first full cover layer 51, continuously winding the belt cover material 40 in a helical shape on the outer side of the first full cover layer 51 in the tire radial direction from the other shoulder region Ash side toward the one shoulder region Ash side. Thus, the belt cover layer 15 is formed using one belt cover material 40, the belt cover layer 15 including the second full cover layer 52 stacked on the outer side in the tire radial direction of the first full cover layer 51 including the lap winding portion 45.

In the belt cover layer 15 with the first full cover layer 51 and the second full cover layer 52 stacked as described above, in the portion of the belt cover layer 15 in which the lap portions 46 are located in the tire width direction, the belt cover material 40 includes three or more layers lapped in the tire radial direction. This enables a more reliable increase in the strength of the portion of the belt cover layer 15 in which the lap winding portion 45 is located in the belt cover layer 15 in the tire width direction, allowing for a reliable increase in the strength at break of the central region of the tread portion 2 in the tire width direction. As a result, shock bursts caused by the projection 105 being trodden during traveling of the vehicle can be more reliably suppressed, allowing shock burst resistance performance to be more reliably improved.

Note that in a case where the first full cover layer 51 and the second full cover layer 52 are formed in the belt cover layer 15, the positional relationship in the tire radial direction may be opposite to that described above. In other words, the first full cover layer 51 including the lap winding portion 45 may be stacked on the outer side of the second full cover layer 52 in the tire radial direction. Additionally, by also providing the second full cover layer 52 with the lap winding portion 45, the belt cover layer 15 may include a portion in which four layers of belt cover material 40 are lapped in the tire radial direction.

Figure 10:
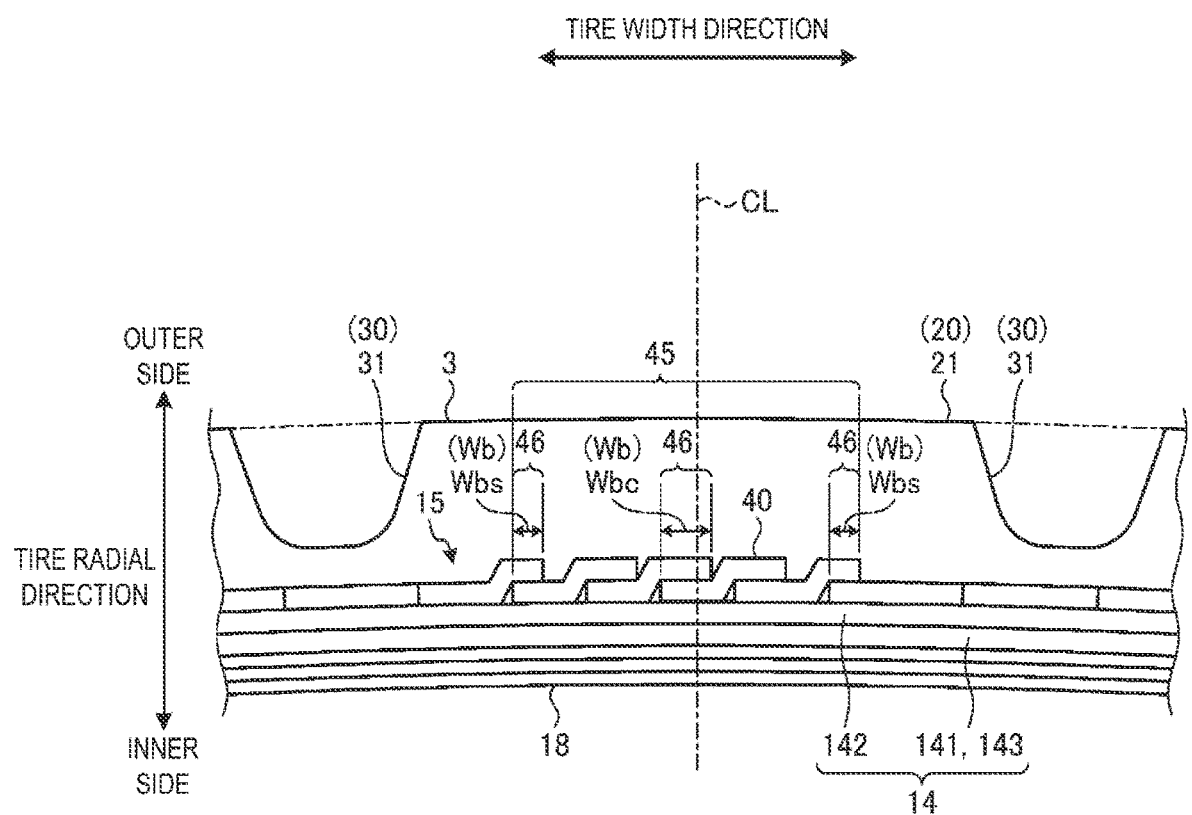
FIG. 10 is an explanatory diagram of a modified example of the pneumatic tire according to an embodiment, in which the width of a lap portion varies between a central region and an end portion region of a lap winding portion in the tire width direction.

Additionally, in the lap winding portion 45 of the belt cover layer 15, the width Wb of the lap portion 46 may vary depending on the position in the tire width direction. FIG. 10 is an explanatory diagram of a modified example of the pneumatic tire 1 according to an embodiment, in which the width Wb of the lap portion 46 varies between a central region and an end portion region of the lap winding portion 45 in the tire width direction. For example, as illustrated in FIG. 10, the width Wb of each lap portion 46 of the lap winding portion 45 included in the belt cover layer 15 may be formed such that a width Wbc of each lap portion 46 in the central region of the lap winding portion 45 in the tire width direction is greater than a width Wbs of each lap portion 46 in the end portion region of the lap winding portion 45 in the tire width direction. In other words, the width Wbs of each lap portion 46 in the end portion region of the lap winding portion 45 in the tire width direction may be formed smaller than the width Wbc of each lap portion 46 in the central region of the lap winding portion 45 in the tire width direction.

In this way, the width Wbs of each lap portion 46 in the end portion region of the lap winding portion 45 in the tire width direction is smaller than the width Wbc of each lap portion 46 in the central region of the lap winding portion 45 in the tire width direction, and thus in a case where the lap winding portion 45 is formed in the belt cover layer 15 to increase the strength of the portion in which the lap winding portion 45 is located, a rapid change in strength can be suppressed at the boundary portion between the lap winding portion 45 and the portions other than the lap winding portion 45. Accordingly, in a case where the lap winding portion 45 is formed in the belt cover layer 15 to increase the strength at break of the central region of the tread portion 2 in the tire width direction, the strength of the tread portion 2 in the tire width direction can be varied moderately depending on the position on the tread portion 2 in the tire width direction. This allows suppression of the adverse effect, on running performance, of a rapid change in the strength of the tread portion 2 in the tire width direction depending on the position on the tread portion 2 in the tire width direction.

Figure 11:
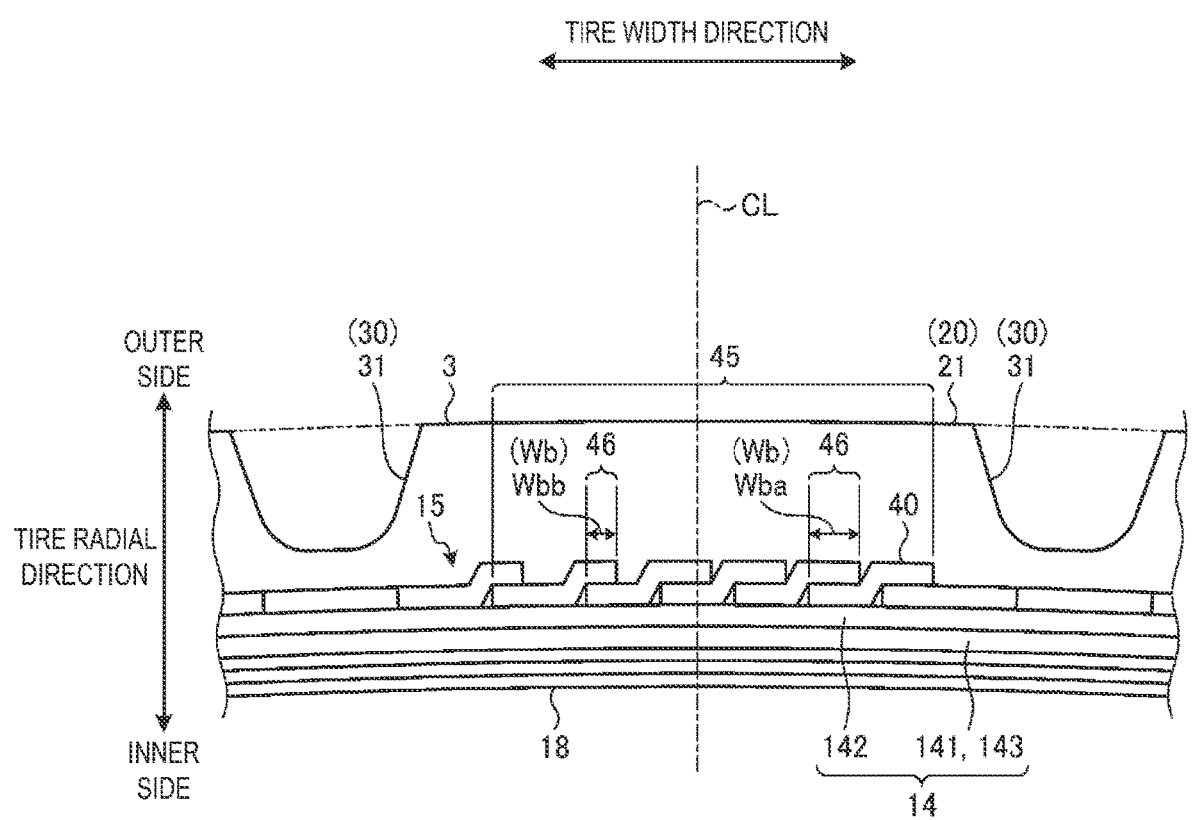
FIG. 11 is an explanatory diagram of a modified example of the pneumatic tire according to an embodiment, in which the width of the lap portion varies between both sides of the lap winding portion in the tire width direction.

In addition, in a case where the width W b of the lap portion 46 is varied depending on the position on the lap winding portion 45 in the tire width direction, the width Wb may be varied between the portions other than the central region and the end portion region of the lap winding portion 45 in the tire width direction. FIG. 11 is an explanatory diagram of a modified example of the pneumatic tire 1 according to an embodiment, in which the width Wb of the lap portion 46 varies between the opposite sides of the lap winding portion 45 in the tire width direction. For example, as illustrated in FIG. 11, the width Wb of each lap portion 46 in the lap winding portion 45 included in the belt cover layer 15 may be varied between one end side, where the lap portion 46 has a width Wba, and the other end side, where the lap portion 46 has a width Wbb, of the lap winding portion 45 in the tire width direction. For example, in a case where the rigidity of the tread portion 2 varies between the opposite sides of tire equator line CL in the tire width direction due to the asymmetry of the tread pattern with respect to the tire equator line CL, the width Wb of each lap portion 46 in the lap winding portion 45 may be varied between the opposite sides of the tire equator line CL in the tire width direction. Alternatively, for the pneumatic tire 1 for which the vehicle mounting direction is defined, the width Wb of the lap portion 46 may be varied between a portion of the lap winding portion 45 located relatively outward in the vehicle mounting direction and a portion of the lap winding portion 45 located relatively inward in the vehicle mounting direction. By varying the width Wb of the lap portion 46 between the opposite sides of the lap winding portion 45 in the tire width direction depending on the aspect of the tread portion 2 or the pneumatic tire 1, the shock burst resistance performance can be improved without affecting the running performance.

In the above-described embodiment, four main grooves 30 are formed, but the number of main grooves 30 may be other than four. In the embodiments described above, although the center land portion 21 is positioned on the tire equatorial plane CL, the land portion 20 needs not to be positioned on the tire equatorial plane CL. For example, the main groove 30 may be positioned on the tire equatorial plane CL. In a case where the main groove 30 is located on the tire equatorial plane CL, at least a part of the lap winding portion 45 of the belt cover layer 15 is preferably located on the inner side in the tire radial direction of one of the plurality of land portion 20 that is closest to the tire equatorial plane CL.

Examples

FIGS. 12A-12B include a table showing results of performance evaluation tests of pneumatic tires. In relation to the pneumatic tire 1 described above, description will be given of performance evaluation tests conducted on a pneumatic tire according to Conventional Example, the pneumatic tires 1 according to embodiments of the present technology, and pneumatic tires according to Comparative Examples to be compared with pneumatic tires 1 according to the embodiments of the present technology. For the performance evaluation tests, tests were conducted on the shock burst resistance performance, corresponding to shock burst resistance, and on the productivity during tire manufacture.

The performance evaluation tests were performed using the pneumatic tire 1 having the nominal size of 275/40ZR19 105Y of the tire defined by JATMA and mounted on a standard rim wheel of JATMA having a rim size of 19×9.5 J. The evaluation method for each of the test items was evaluated for the plunger test by filling the test tire with an air pressure of a regular internal pressure, performing a plunger breakage test, in accordance with JIS K6302 with a plunger diameter of 19 mm and an insertion speed of 50 mm/minute, and measuring a tire breaking energy J. Shock burst resistance performance is expressed as index values with Conventional Example described below being assigned the value of 100. Larger index values indicate superior tire strength and superior shock burst resistance performance.

In addition, regarding productivity, a time required for winding the belt cover materials 40 in the step of winding the belt cover materials 40 during the manufacturing of the tire was measured. The productivity is expressed as index evaluations of a reciprocal of the measured time with Conventional Example described below being assigned as 100. Larger index values indicate shorter winding time and higher productivity. Note that an index value of 90 or more is assumed to indicate the suppression of significant degradation of performance with respect to the Conventional Example.

The performance evaluation tests were conducted on 14 types of pneumatic tires including a pneumatic tire according to Conventional Example, corresponding to an example of a conventional pneumatic tire, Examples 1 to 9 corresponding to examples of the pneumatic tire 1 according to an embodiment of the present technology, and Comparative Examples 1 to 4 corresponding to examples of pneumatic tires to be compared with the pneumatic tire 1 according to the an embodiment of the present technology. Note that in the pneumatic tire according to Conventional Example, the belt cover layer 15 is formed by one belt cover material 40 but does not include the lap winding portion 45. Additionally, in the pneumatic tire according to Comparative Example 1, after the belt cover material 40 of the belt cover layer 15 is wound in a helical shape to form a full cover layer, the belt cover material 40 is cut once, and the belt cover material 40 is wound only around a central portion region of the full cover layer in the tire width direction on the outer side of the full cover layer in the tire radial direction, thus forming, in the central portion region of the full cover layer in the tire width direction, a two-layer portion in which the belt cover layer 40 includes two layers. Additionally, in the pneumatic tires according to Comparative Examples 2 and 3, the width Ws of the lap winding portion 45 included in the belt cover layer 15 is not within the range of 3% or more and 30% or less of the width CW of the belt cover layer 15. Also, in the pneumatic tire of Comparative Example 4, in a portion located in the shoulder region Ash of the belt cover layer 15, the circumferential portions adjacent to each other in the tire width direction of the belt cover material 40 are lapped in the tire radial direction.

In contrast, in Examples 1 to 9, corresponding to examples of the pneumatic tire 1 according to an embodiment of the present technology, the belt cover layer 15 is formed from one belt cover material 40 and includes the lap winding portion 45, and the width Ws of the lap winding portion 45 is within the range of 3% or more and 30% or less of the width CW of the belt cover layer 15, and in the portion of the belt cover layer 15 located in the shoulder region Ash, the circumferential portions, adjacent in the tire width direction, of the belt cover material 40 are wound without being lapped in the tire radial direction. Furthermore, the pneumatic tires 1 according to Examples 1 to 9 differ from one another in the width Ws of the lap winding portion 45 of the belt cover layer 15 in the tire width direction, the width Wb of each lap portion 46 included in the lap winding portion 45 with respect to the width Wa of the belt cover material 40, and whether the belt cover layer 15 includes the second full cover layer 52.

As a result of the performance evaluation tests conducted using these pneumatic tires, as indicated in FIGS. 12A-12B, it was revealed that compared with Conventional Example, the pneumatic tires 1 according to Examples 1 to 9 can improve the shock burst resistance performance while suppressing a decrease in productivity as much as possible, allowing better improvement in comprehensive performance including a combination of the shock burst resistance performance and the productivity than Conventional Example and Comparative Examples 1 to 4. In other words, the method for manufacturing the pneumatic tires 1 according to Examples 1 to 9 can achieve both shock burst resistance performance and productivity in a compatible manner.

The invention claimed is:

1. A pneumatic tire comprising:
a tread portion, the tread portion including a plurality of main grooves extending in a tire circumferential direction and a plurality of land portions defined by the plurality of main grooves in a ground contact surface, where, of the plurality of land portions, a land portion positioned on a tire equatorial plane is defined as a center land portion;
a belt layer disposed in the tread portion; and
a belt cover layer disposed on an outer side of the belt layer in a tire radial direction,
the belt cover layer being disposed spanning between shoulder regions on both sides in a tire width direction,
the belt cover layer being formed by winding one belt cover material having a band-like shape, in a helical shape around a tire rotation axis on the outer side of the belt layer in the tire radial direction,
the belt cover layer comprising a lap winding portion formed between the shoulder regions on both sides in the tire width direction, the lap winding portion comprising a lap portion in which parts of circumferential portions, adjacent in the tire width direction, of the belt cover material wound in a helical shape are lap-wound in the tire radial direction,
a width of the lap winding portion in the tire width direction being within a range of 3% or more and 18% or less of a width of the belt cover layer in the tire width direction,
a width of the lap winding portion is narrower than a width of the center land portion in the ground contact surface, and
in portions of the belt cover layer located in the shoulder regions, the circumferential portions, adjacent in the tire width direction, of the belt cover material wound in a helical shape being wound without being lapped in the tire radial direction.

2. The pneumatic tire according to claim 1, wherein the width of the lap winding portion in the tire width direction is within a range of 5 mm or more and 40 mm or less.

3. The pneumatic tire according to claim 2, wherein the lap winding portion is formed across a tire equatorial plane in the tire width direction.

4. The pneumatic tire according to claim 3, wherein a width of the lap portion of in the lap winding portion is within a range of 20% or more and 70% or less of a width of the belt cover material.

5. The pneumatic tire according to claim 4, wherein the belt cover layer comprises:
a first full cover layer comprising the lap winding portion and formed spanning between the shoulder regions on both sides in the tire width direction; and
a second full cover layer stacked on the first full cover layer in the tire radial direction and formed spanning between the shoulder regions on both sides in the tire width direction, and
in a portion of the belt cover layer in which the lap portion is located in the tire width direction, the belt cover material comprises three or more layers lapped in the tire radial direction.

6. The pneumatic tire according to claim 5, wherein in the lap winding portion, a width of the lap portion varies depending on a position in the tire width direction.

7. The pneumatic tire according to claim 1, wherein the lap winding portion is formed across a tire equatorial plane in the tire width direction.

8. The pneumatic tire according to claim 1, wherein a width of the lap portion of in the lap winding portion is within a range of 20% or more and 70% or less of a width of the belt cover material.

9. The pneumatic tire according to claim 1, wherein the belt cover layer comprises:
a first full cover layer comprising the lap winding portion and formed spanning between the shoulder regions on both sides in the tire width direction; and
a second full cover layer stacked on the first full cover layer in the tire radial direction and formed spanning between the shoulder regions on both sides in the tire width direction, and
in a portion of the belt cover layer in which the lap portion is located in the tire width direction, the belt cover material comprises three or more layers lapped in the tire radial direction.

10. The pneumatic tire according to claim 1, wherein in the lap winding portion, a width of the lap portion varies depending on a position in the tire width direction.

11. A method of manufacturing a pneumatic tire, in which a belt cover layer is disposed by winding a belt cover material having a band-like shape, in a helical shape around a tire rotation axis on an outer side of a belt layer in a tire radial direction, the method comprising the steps of:
forming the belt cover layer between shoulder regions by winding one belt cover material in a helical shape spanning between the shoulder regions on both sides in a tire width direction; and forming, between the shoulder regions on both sides in the tire width direction, a lap winding portion in which parts of circumferential portions, adjacent in the tire width direction, of the belt cover material wound in a helical shape are lap-wound in the tire radial direction, the step of forming the lap winding portion being comprised in the step of forming the belt cover layer, in the step of forming the belt cover layer between the shoulder regions, in portions of the belt cover layer located in the shoulder regions, the circumferential portions, adjacent in the tire width direction, of the belt cover material wound in a helical shape being wound without being lapped in the tire radial direction, and in the step of forming the lap winding portion, the lap winding portion being formed such that a width of the lap winding portion in the tire width direction is within a range of 3% or more and 18% or less of a width of the belt cover layer in the tire width direction, and a width of the lap winding portion is narrower than a width of a center land portion in a ground contact surface, and in portions of the belt cover layer located in the shoulder regions, the circumferential portions, adjacent in the tire width direction, of the belt cover material wound in a helical shape being wound without being lapped in the tire radial direction.

12. A pneumatic tire comprising:
a tread portion;
a belt layer disposed in the tread portion; and
a belt cover layer disposed on an outer side of the belt layer in a tire radial direction,
the belt cover layer being disposed spanning between shoulder regions on both sides in a tire width direction, the belt cover layer being formed by winding one belt cover material having a band-like shape, in a helical shape around a tire rotation axis on the outer side of the belt layer in the tire radial direction,
the belt cover layer comprising a lap winding portion formed between the shoulder regions on both sides in the tire width direction, the lap winding portion comprising a lap portion in which parts of circumferential portions, adjacent in the tire width direction, of the belt cover material wound in helical shape are lap-wound in the tire radial direction,
a width of the lap winding portion in the tire width direction being within a range of 3% or more and 30% or less of a width of the belt cover layer in tire width direction,
the width of the lap winding portion in the tire width direction is within a range of 5 mm or more and 35 mm or less, and
in portions of the belt cover layer located in the shoulder regions, the circumferential portions, adjacent in the tire width direction, of the belt cover material wound in a helical shape being wound without being lapped in the tire radial direction.

13. A pneumatic tire comprising:
a tread portion, the tread portion including four main grooves extending in a tire circumferential direction and a plurality of land portions defined by the four main grooves in a ground contact surface, where, of the plurality of land portions, a land portion positioned on a tire equatorial plane is defined as a center land portion;
a belt layer disposed in the tread portion; and
a belt cover layer disposed on an outer side of the belt layer in a tire radial direction,
the belt cover layer being disposed spanning between shoulder regions on both sides in a tire width direction, the belt cover layer being formed by winding one belt cover material having a band-like shape, in a helical shape around a tire rotation axis on the outer side of the belt layer in the tire radial direction,
the belt cover layer comprising a lap winding portion formed between the shoulder regions on both sides in the tire width direction, the lap winding portion comprising a lap portion in which parts of circumferential portions, adjacent in the tire width direction, of the belt cover material wound in a helical shape are lap-wound in the tire radial direction,
a width of the lap winding portion in the tire width direction being within a range of 3% or more and 30% or less of a width of the belt cover layer in the tire width direction,
a width of the lap winding portion is narrower than a width of the center land portion in the ground contact surface, and
in portions of the belt cover layer located in the shoulder regions, the circumferential portions, adjacent in the tire width direction, of the belt cover material wound in a helical shape being wound without being lapped in the tire radial direction.

14. A pneumatic tire comprising:
a tread portion, the tread portion including a plurality of main grooves extending in a tire circumferential direction and a plurality of land portions defined by the plurality of main grooves in a ground contact surface, where, of the plurality of land portions, a land portion positioned on a tire equatorial plane is defined as a center land portion;
a belt layer disposed in the tread portion; and
a belt cover layer disposed on an outer side of the belt layer in a tire radial direction,
the belt cover layer being disposed spanning between shoulder regions on both sides in a tire width direction, the belt cover layer being formed by winding one belt cover material having a band-like shape, in a helical shape around a tire rotation axis on the outer side of the belt layer in the tire radial direction,
the belt cover layer comprising a lap winding portion formed between the shoulder regions on both sides in the tire width direction, the lap winding portion comprising a lap portion in which parts of circumferential portions, adjacent in the tire width direction, of the belt cover material wound in a helical shape are lap-wound in the tire radial direction,
a width of the lap winding portion in the tire width direction being within a range of 3% or more and 30% or less of a width of the belt cover layer in the tire width direction,
a width of the lap winding portion being narrower than a width of the center land portion in the ground contact surface,
in portions of the belt cover layer located in the shoulder regions, the circumferential portions, adjacent in the tire width direction, of the belt cover material wound in a helical shape being wound without being lapped in the tire radial direction,
a width ($Wbs$) of each lap portion in an end portion region of the lap winding portion in the tire width direction being formed smaller than a width ($Wbc$) of each lap portion in a central region of the lap winding portion in the tire width direction, and in a tire meridian cross-section, a shoulder region (Ash) being a region positioned between two shoulder region boundary lines (Lsh) at an end portion of a widest belt in the tire width direction, the shoulder region boundary lines (Lsh) being respective lines perpendicularly extending from a position (P) at 85% of a width of the widest belt in the tire width direction, the widest belt being one belt of the plurality of belts of the belt layer and having a widest width in the tire width direction among the plurality of belts of the belt layer.

* * * * *